United States Patent
Li et al.

(10) Patent No.: US 9,383,452 B2
(45) Date of Patent: Jul. 5, 2016

(54) SPIRAL BIASING ADAPTOR FOR USE IN SI DRIFT DETECTORS AND SI DRIFT DETECTOR ARRAYS

(71) Applicant: BROOKHAVEN SCIENCE ASSOCIATES, LLC, Upton, NY (US)

(72) Inventors: Zheng Li, South Setauket, NY (US); Wei Chen, East Setauket, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 88 days.

(21) Appl. No.: 14/352,538

(22) PCT Filed: Oct. 24, 2012

(86) PCT No.: PCT/US2012/061573
§ 371 (c)(1),
(2) Date: Apr. 17, 2014

(87) PCT Pub. No.: WO2013/063032
PCT Pub. Date: May 2, 2013

(65) Prior Publication Data
US 2014/0306120 A1 Oct. 16, 2014

Related U.S. Application Data

(60) Provisional application No. 61/551,367, filed on Oct. 25, 2011.

(51) Int. Cl.
*G01T 1/02* (2006.01)
*G01T 1/29* (2006.01)

(52) U.S. Cl.
CPC .................. *G01T 1/02* (2013.01); *G01T 1/2928* (2013.01)

(58) Field of Classification Search
CPC .................................. G01T 1/02; G01T 1/026
See application file for complete search history.

(56) References Cited

U.S. PATENT DOCUMENTS

| 5,053,743 | A  | 10/1991 | Mille et al. |
| 6,249,033 | B1 | 6/2001 | Castoldi et al. |
| 7,812,316 | B2 | 10/2010 | Hansen et al. |
| 2007/0072332 | A1 | 3/2007 | Kemmer |

OTHER PUBLICATIONS

International Search Report of International Application PCT/US2012/061573—Date mailed: Mar. 8, 2013, 4 pages.
Written Opinion of the Searching Authority of International Application No. PCT/US2012/061573—Date mailed: Mar. 8, 2013, 10 pages.
Chen, W., et al., "Development of Thin-Window Silicon Drift Detector for X-ray spectroscopy," *Nuclear Science Symposium Conference Record*, vol. 3, pp. 1954 to 1959, (2007).

(Continued)

*Primary Examiner* — David Porta
*Assistant Examiner* — Faye Boosalis
(74) *Attorney, Agent, or Firm* — Dorene M. Price

(57) ABSTRACT

A drift detector array, preferably a silicon drift detector (SDD) array, that uses a low current biasing adaptor is disclosed. The biasing adaptor is customizable for any desired geometry of the drift detector single cell with minimum drift time of carriers. The biasing adaptor has spiral shaped ion-implants that generate the desired voltage profile. The biasing adaptor can be processed on the same wafer as the drift detector array and only one biasing adaptor chip/side is needed for one drift detector array to generate the voltage profiles on the front side and back side of the detector array.

3 Claims, 16 Drawing Sheets

Single SDD Cell

(56) References Cited

OTHER PUBLICATIONS

Gatti, E., et al., "Semiconductor Drift Chamber—An Application of a Novel Charge Transport Scheme," *Nuclear Instruments and Methods in Physics Research*, vol. 225, pp. 608-614, (1984).

Rehak, P., et al., "Spiral Silicon Drift Detectors," *IEEE Transactions on Nuclear Science*, vol. 36, No. 1, pp. 203-209, (1989).

Rehak, P., et al. "Arrays of silicon drift detectors for an extraterrestrial X-ray spectrometer," *Nuclear Instruments and Methods in Physics Research A*, vol. 624, pp. 260-264, (2010).

Zhang, W., et al., "Design, Simulation and Testing of Large Area Silicon Drift Detectors and Detector Array for X-ray Spectroscopy," *IEEE Transactions on Nuclear Science*, vol. 47, No. 4, pp. 1381 to 1385, (2000).

Park, M., et al., "High $Q$ Microwave Inductors in CMOS Double-Metal Technology and Its Substrate Bias Effects for 2 GHz RF ICs Application," *International Electron Devices Meeting 1997*, pp. 59-62, (Washington, D.C. Dec. 7-10, 1997).

Appels, J., et al., "Local Oxidation of Silicon and Its Application in Semiconductor-Device Technology," *Philips Research Reports*, vol. 25, pp. 118-132, (1970).

Wolf, S., et al., "*Silicon Processing for the VSLI Era: vol. 1 Process Technology*," (Lattice Press, CA, 2000), pp. 531-546 with cover page, title page and bibliographic page. To Be Provided.

Wolf, S., et al., "Silicon Processing for the VSLI Era: vol. 1 Process Technology," (Lattice Press, CA, 2000), pp. 531-546 with title page and bibliographic page.

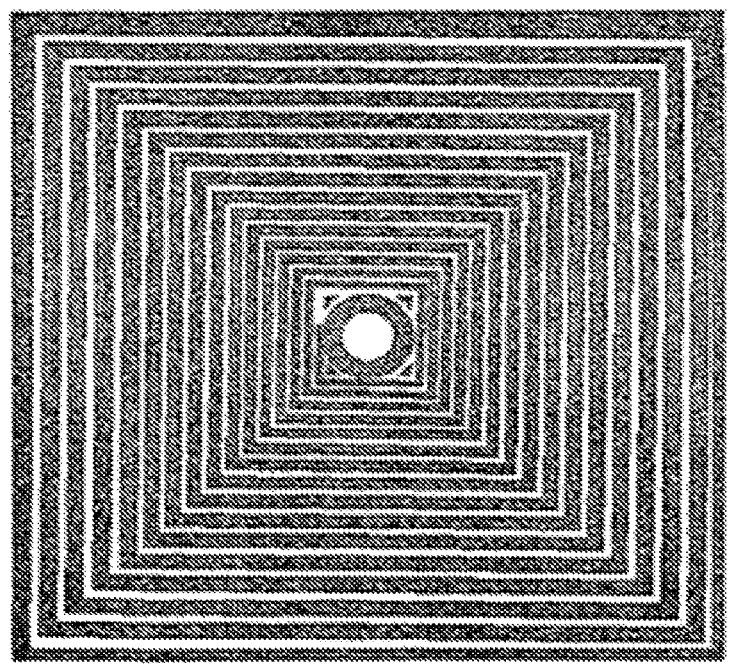
FIG. 13A SBA($I_S$)
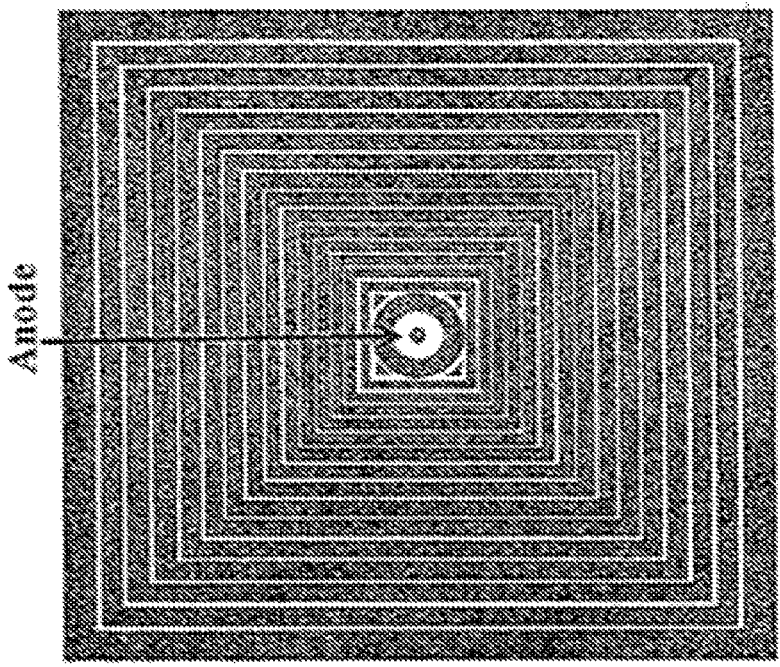
FIG. 13B Single SDD Cell
Anode

SPIRAL BIASING ADAPTOR FOR USE IN SI DRIFT DETECTORS AND SI DRIFT DETECTOR ARRAYS

CROSS-REFERENCE TO A RELATED APPLICATION

This is a 371 application of International Application No. PCT/US/12/61573 filed Oct. 24, 2012, which in turn claims priority to Provisional Application No. 61/551,367 filed on Oct. 25, 2011, the entirety of both of these applications is hereby incorporated by reference in their entirety.

STATEMENT OF GOVERNMENT LICENSE RIGHTS

The present invention was made with government support under contract number DE-AC02-98CH 10886 awarded by the U.S. Department of Energy. The United States government has certain rights in this invention.

FIELD OF THE INVENTION

This invention relates to radiation detectors. In particular, this invention relates to a spiral biasing adaptor configured for use in drift detectors and drift detector arrays.

BACKGROUND

Radiation detectors are well known and are regularly used in various fields. Although originally developed for atomic, nuclear, and elementary particle physics, radiation detectors can now be found in many other areas of science, engineering, and everyday life. Some examples of the areas where radiation detectors are found are deep space imaging, medical imaging, e.g., positron emission tomography, tracking detection in high-energy physics, and radiation-trace imaging for the purpose of national security, among others. In experimental and applied particle physics and nuclear engineering, a radiation detector is a device used to detect, track, and/or identify high-energy particles such as those produced by nuclear decay, cosmic radiation, or particles generated by reactions in particle accelerators. In order to detect radiation, it must interact with matter; and that interaction must be recorded. The main process by which radiation is detected is ionization, in which a particle interacts with atoms of the detecting medium and gives up part or all of its energy to the ionization of electrons (or generation of electron-hole pairs in semiconductors). The energy released by the particle is collected and measured either directly, e.g., by a proportional counter or a solid-state semiconductor detector, or indirectly, e.g., by a scintillation detector. Thus, there are many different types of radiation detectors. Some of the more widely known radiation detectors are gas-filed detectors, scintillation detectors, and semiconductor detectors.

Gas-filled detectors are generally known as gas counters and consist of a sensitive volume of gas between two electrodes. The electrical output signal is proportional to the energy deposited by a radiation event or particle in the gas volume. Scintillation detectors consist of a sensitive volume of a luminescent material (liquid or solid), where radiation is measured by a device that detects light emission induced by the energy deposited in the sensitive volume.

Semiconductor detectors generally include a sensitive volume of semiconductor material placed between a positive electrode (anode) and a negative electrode (cathode). Incident radiation or particles are detected through their interactions with the semiconductor material, which create electron-hole pairs. The number of electron-hole pairs created depends on the energy of the incident radiation/particles. A bias voltage is supplied to the electrodes, causing a strong electric field to be applied to the semiconductor material. Under the influence of the strong electric field, the electrons and holes drift respectively towards the anode (+) and cathode (−). During the drift of the electrons and holes an induced charge is collected at the electrodes. The induced charge generates an electrical current which can be measured as a signal by external circuitry. Since the output signal is proportional to the energy deposited by a radiation event or particle in the semiconductor material, charge collection efficiency primarily depends on the depth of interaction of the incident radiation with the semiconductor material and on the transport properties, e.g., mobility and lifetime, of the electrons and holes generated. Thus, for optimal operation, e.g., maximum signal and resolution, of the detector, the collection of all electron-hole pairs, i.e., full depletion, is desirable.

One member of the semiconductor detector family is a Silicon (Si) Drift Detector (SDD) introduced by E. Gatti and P. Rehak in 1983 (*Nucl. Instr. and Meth.* A 225, pp. 608-614, 1984; incorporated herein by reference in its entirety). In the SDD, an additional electric field parallel to the surface of the wafer is added in order to force the electrons in the energy potential minimum to drift towards the n+ anode based on the principle of the sideward depletion. This is achieved by implanting two arrays of p+ electrodes on both sides of the wafer, instead of the single p+ implants. The p+ electrodes are suitably biased with a voltage gradient in order to provide an electric field parallel to the surface. Once generated by the ionizing radiation, the electrons are focused in the bottom of the potential channel and driven towards the anode region of the detector while the holes, driven by the depletion field, are quickly collected by the nearest p+ electrodes. In the region close to the collecting anode, the bottom of the potential channel is shifted towards the surface where the anode is placed, by suitably biasing the electrode on the opposite side.

The cloud of electrons induces to the anode an output pulse only when the electrons arrive close to it because the electrostatic shelf of the p+ electrodes. The drift time of the electrons may be used to measure one of the interaction coordinates while the collected charge allows the energy released by the incident ionizing event to be measured. SDD is characterized by a very low capacitance of the electrode collecting the signal charge independent of the active area of the device.

The spiral Si drift detector (SDD) is a special type of SDD family of detectors that utilize the cylindrical geometry exemplified in FIG. 1A or a square geometry used for best packing in space shown in FIG. 1B. FIG. 2 illustrates a cross section of the SDD from FIG. 1A. The SDD has a small anode 2 (small relative to a PIN diode anode) at one surface of the substrate 10 and an entrance window layer 6 at the opposite surface of the substrate. Use of a smaller anode results in lower capacitance and thus less of the undesirable electronic noise, resulting in improved resolution. The anode 2 can be surrounded by multiple doped rings 15. The doped rings 15 are biased in such a way that they result in an electric field which causes electrons to flow towards the anode 2. The doped rings 15 can have the same doping or conduction type as the entrance window layer 6. The doped rings 15 and the entrance window layer 6 can have the opposite doping or conduction type as the substrate 10. However, usually the doped rings 15 and the entrance window layer 6 are more highly doped than the substrate 10. The anode 2 can have the same doping or conduction type as the substrate 10. However, usually the anode 2 is more highly doped than the substrate 10.

As shown in FIG. 2, one voltage bias $V_1$ can be applied to the innermost doped ring that is closest to the anode 2 and another voltage $V_2$ can be applied to the outermost ring. Because the rings are electrically coupled, the voltages at the innermost and outermost rings can create a voltage gradient across all of the rings. Another voltage $V_3$ can be applied to the entrance window layer 6. The voltage applied to the entrance window layer $V_3$ can be similar in magnitude to the voltage $V_2$ on the outermost ring. The voltage on the innermost ring $V_1$ can have a lower absolute value than the voltage at the outermost ring $V_2$ or at the entrance window $V_3$. Due to the voltage gradient across the rings and the voltage applied to the entrance window 6, the charge carrier can be drawn towards the anode 2. If $V_2$ and $V_3$ are more negative than $V_1$ and $V_1$ is more negative than the anode 2, then an electron cloud resulting from impinging radiation can be directed to the anode. Although the prior art SDDs can have reduced electronic noise compared with the prior art PIN diode, such SDDs with electrically coupled rings can be costly to manufacture.

In a spiral SDD, the ion implants are needed as both the rectifying junction and voltage divider to create a potential gradient (or drift field) in the SDD for carriers generated by incident particles to drift to the collection anode, as shown in FIG. 3 (illustrating a double-sided spiral SDD as described by P. Rehak et al., *IEEE Trans. Nucl. Sci.*, Vol. 36, No. 1, 203-209 (1989); P. Rehak et al., *Nucl. Instr. and Meth. A,* 624, 260-264 (2010); W. Zhang et al., *IEEE Trans. Nucl. Sci.*, Vol. 47, No. 4, 1381-1385 (2000); E. Gatti and P. Rehak, *Nucl. Instr. and Meth. A,* 225, 608 (1984); each of which is incorporated herein by reference in its entirety).

The optimum surface potential profile $\Phi(r)$ on the front surface that gives a minimum drift time of electrons had been approximated by P. Rehak et al. (1989) for a uniform backside bias voltage of $V^B$ when the radius of the spiral SDD (R) is much larger than the detector thickness (d), i.e., R>>d. The advantage of the spiral as voltage divider is that it can be easily designed and fabricated with non-constant pitch ($p(r)$) and width ($W(r)$), which give a largely exotic surface potential distribution that guaranties a minimum drift time of carriers. To do the same with an external resistor chain, one may have to choose resistors varying from hundreds of k$\Omega$'s to M$\Omega$'s of nearly random values. In general, a double-sided spiral SDD, as shown in FIG. 3 can potentially have a better surface field distribution needed for the minimum drift time (see FIG. 4). However, since the rectifying junction and voltage divider are coupled together in such spiral SDD designs, there is a constraint on the ratio of spiral width to pitch ($W(r)/p(r)$) for more uniform drift field in the drift channel, which results in a large current $I_S$ for a given voltage difference ($V_{out}-V_{E1}$) between the start and end of the spiral. Also, the heat generated by the spiral stays with the SDD, which may cause problems in cooling down the detector. Furthermore, and most importantly, for a spiral SDD array of N×M, the power consumption can be substantial, approaching Watts, e.g., 1-5 W, for large arrays (>100 elements) based on $P=N\times M\times(V_{out}-V_{E1})\times I_S$. Therefore, there is a continuing need to develop new SDD systems and SDD arrays that would avoid overheating, high power consumption, and limitations in the uniformity of the drift field.

SUMMARY

In view of the above-described problems, needs, and goals, a new drift detector, preferably a silicon drift detector (SDD), connected to a spiral biasing adaptor (SBA) is disclosed that can be configured to function as a voltage divider. Generally, the design of the spiral biasing adaptor must satisfy the equation (1), $$\rho_s I \alpha r = E(r) W(r) p(r), \quad (1)$$

where $\rho_s$ is an implant sheet resistance, I is a current, $\alpha r$ is a length of each turn of the spiral, E(r) is a surface electric field potential at a radius r, W(r) is a spiral width of a spiral arm at radius r, and p(r) is a spiral pitch at radius r. For example, for a circular spiral, the radius (r) defines the distance between the center of the SBA and a given ring. For a square geometry used for best packing in space, e.g., FIG. 13A, the radius (r) defines the distance between the center of the SBA and the closest point of the square ring. In a preferred embodiment, the spiral pitch and the spiral width increase with the radius of the SBA from near zero to a maximum value and then decrease with the radius of the SBA to a smaller value.

The spiral biasing adaptor can have a shape of a circular spiral, a triangular spiral, a square spiral, a hexagonal spiral, or some other polygonal spiral. The spiral biasing adaptor can also have a shape that is defined around a fixed center point stepwise or curvilinear at a continuously increasing distance from the fixed center point. The spiral biasing adaptor can be formed on the same wafer as the drift detector. Alternatively, the spiral biasing adaptor can be formed on a separate wafer from the drift detector.

In one embodiment, the spiral biasing adaptor can also function as a rectifying junction. In the embodiment where the spiral biasing adaptor does not function as a rectifying junction, the drift detector has concentric ion-implant rings configured to function as rectifying junctions, which are connected to the spiral biasing adaptor. The drift detector can be connected to the spiral biasing adaptor via wire bonding or double-metal interconnections.

The drift detector has a front side and a back side with a first electric field applied to the front side and a second electric field applied to the back side. In one embodiment, the applied first and second electric fields cause electrons liberated within the drift detector to experience a constant drift field and to follow a flat drift channel over a minimum drift time possible for the drift detector. In another embodiment, the applied first and second electric fields cause electrons liberated within the drift detector to experience a constant drift field and to follow a curved drift channel over a minimized drift time for the configuration of first and second electric fields. The applied first and second electric fields can be symmetric or asymmetric.

The first electric field and the second electric field can be defined by an identical or nearly identical spiral biasing adaptor pattern. Alternatively, the first electric field can be defined by one spiral biasing adaptor pattern and the second electric field can be defined by a different spiral biasing adaptor pattern. The drift detector can be connected to a spiral biasing adaptor only at the front side, or at both the front side and the back side.

These and other characteristics of the spiral biasing adaptor and a drift detector that employs such an adaptor will become more apparent from the following description and illustrative embodiments, which are described in detail with reference to the accompanying drawings.

BRIEF DESCRIPTION OF THE DRAWINGS

FIG. 13A is a schematic illustration of an exemplary spiral biasing adaptor (SBA) chip.

FIG. 13B is a schematic illustration of an exemplary matching SDD cell to the SBA in FIG. 13A with $p_{SDD}(r)=p_{BSA}(r)$, and $W_{SDD}(r)=0.8\, p_{SDD}(r)$.

FIG. 19A is the upper left corner region of the SBA. The corresponding Al bonding pads are connected to a closed-ring SDD of the same p(r). FIG. 19B is the center region of the SBA.

DETAILED DESCRIPTION

Figure 1A:
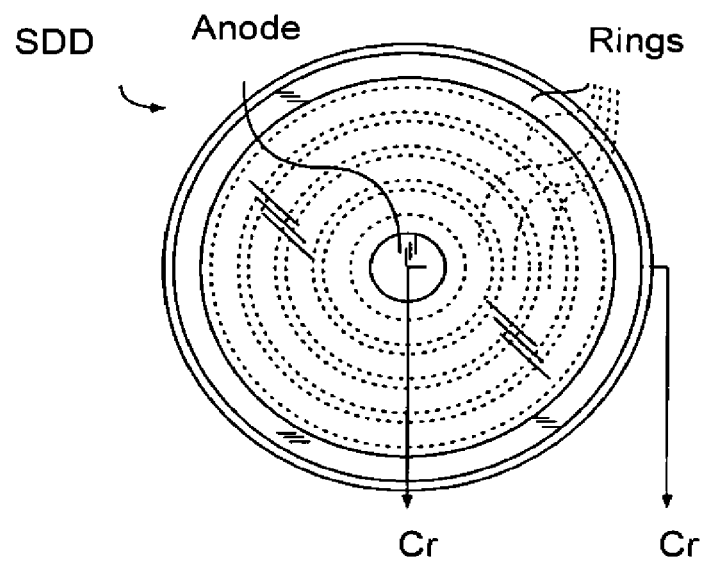
FIG. 1 illustrates an example of a conventional prior art spiral Si drift detector (SDD) having a cylindrical geometry (FIG. 1A) or a square geometry used for best packing in space (FIG. 1B).
Figure 2:
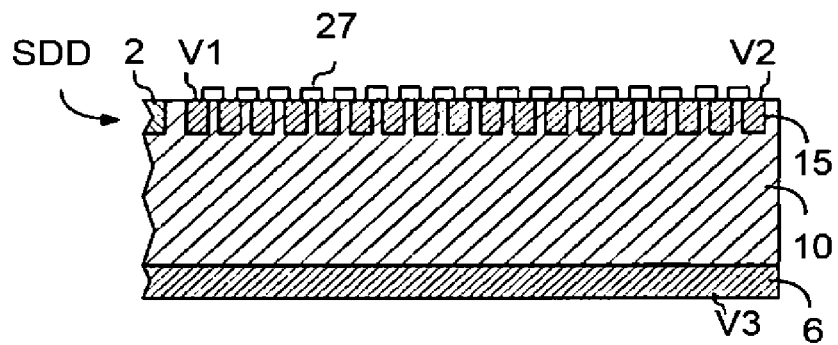
FIG. 2 illustrates a cross section of the prior art SDD from FIG. 1A.

A drift detector, preferably a silicon drift detector (SDD), connected to a spiral biasing adaptor (SBA) by a double metal connection or a plurality of wire bonds is disclosed. In one embodiment, the SDD can form an array, e.g., N×M, of SDD detectors that are interconnected between closed rings. The array can use one or more implant chips of spiral biasing adaptor (SBA). Such SDD detectors or SDD detector arrays are less prone to overheating and have lower power consumption than conventional SDD detectors, and minimize constraints in the uniformity of the drift field in the drift channel compared to conventional SDD detectors.

The implementation of the SBA with the drift detector or a drift detector array allows a skilled artisan to design a drift detector or a drift detector array with any geometry having minimum current and minimum drift time of carriers, as long as the design of the SBA satisfies equation (1), $$\rho_s I \alpha r = E(r) W(r) p(r), \tag{1}$$

where $\rho_s$ is an implant sheet resistance, I is a current, αr is a length of each turn of the spiral, E(r) is a surface electric field at a radius r, W(r) is a spiral width of a spiral arm at radius r, and p(r) is a spiral pitch at radius r. This calculation (eq. (1)) can also be used to design a drift detector or an array of drift detectors, preferably of the SDD type, having a minimum current and a minimum drift time of carriers, while retaining the advantage of the implant spiral as a voltage divider. Throughout this specification, the drift detector and the biasing adaptor will be described using one or more sets of parameters and configurations due to the advantages provided by their use. However, those skilled in the art would understand that such description does not limit the scope and breadth of the disclosed invention.

(1) Parameters to Obtain Minimum Carrier Drift Time of Electrons

The parameters that provide the minimum carrier drift time of electrons are obtained from the calculation of the surface potential profile Φ(r) by assuming that the negative electrical potential φ(r,x) of the drift detector in cylindrical coordinates (r, x, θ) satisfies the conditions (2):

$$\frac{\partial \phi(r, x, \theta)}{\partial r} \ll \frac{\partial \phi(r, x, \theta)}{\partial x} \tag{2}$$

$$\frac{\partial \phi(r, x, \theta)}{\partial \theta} = 0 \text{ or } \phi(r, x, \theta) = \phi(r, x)$$

Then the Poisson Equation can be approximated as (3), $$\frac{\partial^2 \phi(r, x)}{\partial x^2} \approx \frac{q N_{eff}}{\varepsilon_o \varepsilon} \tag{3}$$

where $N_{eff}$ is the effective doping concentration of the SBA. The solution of equation (3) is $$\phi(r, x) = V_{fd}\left(\frac{x}{d}\right)^2 + \left(\frac{\Psi(r) - \Phi(r) - V_{fd}}{d}\right)x + \Phi(r) \tag{4}$$

where $$V_{fd} = \frac{qN_D d^2}{2\varepsilon_0 \varepsilon} \quad (5)$$

is the full depletion voltage, d is the thickness of the SBA/SDD, and $\Phi(r)$ and $\psi(r)$ are the potential profiles of the front side and the backside (x=d), respectively (5):

$$\Phi(r)=\phi(r,x=0) \text{ and } \psi(r)=\phi(r,x=d) \quad (5)$$

Figure 5:
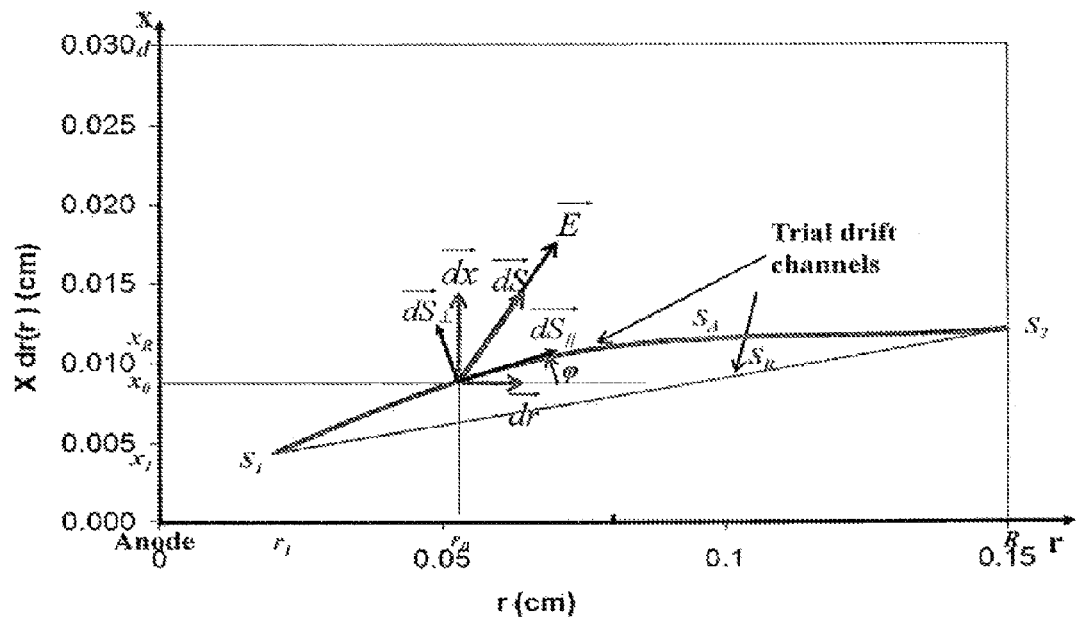
FIG. 5 is a plot showing the possible and optimum drift paths for carriers in an SDD according to the present invention.

The optimum drift path, that gives a minimum drift time of carriers, can be calculated from point $S_1$ to point $S_2$ as shown in FIG. 5. In general in a path connecting $S_1$ and $S_2$ (trial path $S_A$), if coordinates are changed from $X(x^1,x^2)=(r,x)=x^i$ (i=1, 2) to $Y(y^1,y^2)=(S_{\|},S_{\perp})=y^j$ (j=1,2) where $S_{\|}$ is tangent and $S_{\perp}$ is perpendicular to the path S, respectively, for the covariant vector electric field (carrier drift field) along the path $$E_{dr,i}(X) = \left.\frac{\partial \phi(X)}{\partial x^i}\right|_S,$$

transforms as (6):

$$E_{dr,j}(Y) = \left.\frac{\partial \phi(Y)}{\partial y^j}\right|_S = \left.\frac{\partial x^i}{\partial y^j} E_i(X)\right|_S = \left.\frac{\partial x^i}{\partial y^j}\frac{\partial \phi(X)}{\partial x^i}\right|_S \quad (6)$$

where the Einstein summation convention of summing the indices (up and low) is used. In the present case, it provides (7, 8):

$$\begin{cases} E_{dr,S_{\|}}(Y) = \left.\frac{\partial \phi(Y)}{\partial S_{\|}}\right|_S = \left.\frac{\partial r \partial \phi(X)}{\partial S_{\|} \partial r}\right|_S + \left.\frac{\partial x \partial \phi(X)}{\partial S_{\|} \partial x}\right|_S = \\ \cos\varphi E_{dr,r}(X) + \sin\varphi E_{dr,x}(X) \\ E_{dr,S_{\perp}}(Y) = \left.\frac{\partial \phi(Y)}{\partial S_{\perp}}\right|_S = \left.\frac{\partial r \partial \phi(X)}{\partial S_{\perp} \partial r}\right|_S + \left.\frac{\partial r \partial \phi(X)}{\partial S_{\perp} \partial r}\right|_S = \\ -\sin\varphi E_{dr,x}(X) + \cos\varphi E_{dr,r}(X) \end{cases} \quad (7)$$

$$\begin{cases} E(X)^2 = E_{dr,r}(X)^2 + E_{dr,x}(X)^2 = E_{dr,S_{\|}}(Y)^2 + E_{dr,S_{\perp}}(Y)^2 \\ dS^2 = dx^2 + dr^2 = dS_{\|}^2 + dS_{\perp}^2 \end{cases} \quad (8)$$

For the path S to be a drift channel, i.e., electrons are confined on the path, $E_{S_{\perp}}$ and $dS_{\perp}$ must be 0, which gives (9):

$$\left.\frac{\partial \phi(r,x)}{\partial S_{\perp}}\right|_S = E_{dr,S_{\perp}}(r,x) = 0 \quad (9)$$

as the definition of the drift channel. This provides that (10)

$$\tan\varphi = \frac{E_{dr,x}(X)}{E_{dr,r}(X)} = \frac{dx}{dr}; \text{ and} \quad (10)$$

$$E_{dr}(X) = E_{dr,S}(X) = E_{dr,S_{\|}}(X), dS = dS_{\|}$$

$$\frac{dS}{E_{dr,S}(X)} = \frac{\sqrt{dx^2 + dr^2}}{\sqrt{E_{dr,x}(X)^2 + E_{dr,r}(X)^2}} =$$

$$= \frac{dr\sqrt{\left(\frac{dx}{dr}\right)^2 + 1}}{E_{dr,r}(X)\sqrt{\left(\frac{E_{dr,x}(X)}{E_{dr,r}(X)}\right)^2 + 1}}$$

$$= \frac{dr}{E_{dr,r}(X)}$$

$$= \frac{dx}{E_{dr,x}(X)}$$

Thus, the carrier drift time $(t_{dr})$ following any path S connecting $S_1$ and $S_2$ is (11), $$t_{dr} = \int_{S_1}^{S_2} \frac{dS}{\mu \left.\frac{\partial \phi}{\partial S}\right|_S} = \int_{r_1}^{R} \frac{dr}{\mu \left.\frac{\partial \phi}{\partial r}\right|_S} = \int_{x_1}^{x_R} \frac{dx}{\mu \left.\frac{\partial \phi}{\partial x}\right|_S} \quad (11)$$

where $r_1$ is the radius of the inner most ring and R is the radius of the outer most ring. In contrast to Rehak et al. (1989), the present approach provides a generalized way to find the $\phi(r,x)$ on path S, i.e. $\phi(r,x)|_S$, that gives the shortest drift time $t_{dr}$. Specifically, the method provides that (12), $$t_{dr} = \int_{r_1}^{R} L(r, \phi, \phi')dr \quad (12)$$

and $$L(r, \phi, \phi') = L(\phi') = \frac{1}{\mu \left.\frac{\partial \phi}{\partial r}\right|_S} = \frac{1}{\mu \phi'}$$

which have no explicit dependence on r and $\phi$ so $\phi(r,x)|_S$, is the solution of the Euler-Lagrange Equation (13):

$$\frac{\partial L}{\partial \phi} - \frac{d}{dr}\frac{\partial L}{\partial \phi'} = 0 \quad (13)$$

that gives (14), $$\phi' = \left.\frac{\partial \phi(r,x)}{\partial r}\right|_S \equiv E_{dr,r}(r,x) = \text{constant} \equiv E_{dr,r} \quad (14)$$

Eq. (14) says that the r-component of the drift field on the optimum drift path is a constant. In fact, from Eq. (10), the same conclusion for the E-field components can be derived on the other two directions (S, x) (15):

$$E_{dr,S}(Y)=E_{dr,S}, E_{dr,r}(r,x)=E_{dr,r} \quad (15)$$

and $E_{dr,x}(r,x)=E_{dr,x}$

So the generalized optimum drift path (or channel) is path B in FIG. 5, a straight line with constant E-field along the path. In contrast to the findings of Rehak et al. (1989), the x-component of the E field on the optimum drift channel is a constant $(E_{dr,x})$ and not zero. Only the $S_{\perp}$-component of the E-field on the optimum drift channel is zero (see Eq. (9)). This observation is supported by the fact that the displacement in the x-direction is not zero, i.e., d>Δx>0, when an electron drifts from point $S_1$ to point $S_2$ (see FIG. 5).

The solution obtained by Rehak et al. (1989) is similar to Eq. (14), although in the vector transformation, $$E_{dr,x}(X) = \left.\frac{\partial \phi(X)}{\partial x}\right|_S$$

was assumed to be zero, which can be a good approximation if

R >> d since $$E_{dr,x}(X) = \left.\frac{\partial \phi(X)}{\partial r}\right|_S \tan\varphi = \left.\frac{\partial \phi(X)}{\partial r}\right|_S \frac{d}{R-r_1} << \left.\frac{\partial \phi(X)}{\partial r}\right|_S$$

if $d << R - r_1 (\sim R)$.

(See Rehak et al. (1989) and Zhang et al. (2000).) Another generalization taken from Rehak et al. (1989) is that the drift channel (S), or $x_{ch}(r)$, is defined by (16):

$$\left.\frac{\partial \phi(r, x)}{\partial x}\right|_S = E_{dr,x} \neq 0 \quad (16)$$

which gives (17), $$x_{ch}(r) = \frac{d}{2}\left[1 - \frac{\Psi(r) - \Phi(r)}{V_{fd}}\right] + \frac{d}{2}\frac{E_{dr,x}}{V_{fd}/d} \quad (17)$$

$$\equiv x_{min}(r) + \frac{d}{2}\frac{E_{dr,x}}{V_{fd}/d}$$

where $x_{min}(r)$ was defined as the drift channel by Rehak et al. (1989). As shown in Eq. (17), the real position of the drift channel is shifted towards the backside by $$\frac{d}{2}\frac{E_{dr,x}}{V_{fd}/d},$$

which is negligible if R>>d. The potential in the drift channel is (18):

$$\phi(r, x_{ch}) = \frac{qN_D}{2\varepsilon_o\varepsilon}x_{ch}(r)^2 + \left(\frac{\Psi(r) - \Phi(r)}{d} - \frac{qN_D d}{2\varepsilon_o\varepsilon}\right)x_{ch}(r) + \Phi(r) \quad (18)$$

and therefore the equation to define the surface potential profile(s) is (19):

$$\frac{\partial \phi(r, x_{ch}(r))}{\partial r} = \left.\frac{\partial \phi(r, x)}{\partial r}\right|_S = \quad (19)$$

$$\frac{1}{2}\left(\frac{d\Psi(r)}{dr} + \frac{d\phi(r)}{dr}\right) - \frac{1}{2}\left[\frac{\Psi(r) - \phi(r)}{V_{fd}}\right]\left(\frac{d\Psi(r)}{dr} - \frac{d\phi(r)}{dr}\right)$$

In Eq. (19), $$t_{dr} = \int_{r_1}^{R} \frac{dr}{\mu\frac{\partial\phi(r, x_{ch}(r))}{\partial r}} \quad (20)$$

$$= \int_{r_1}^{R} \frac{dr}{\frac{\mu}{2}\left(\frac{d\Psi(r)}{dr} + \frac{d\Phi(r)}{dr}\right) - \frac{\mu}{2}\left[\frac{(\Psi(r) - \Phi(r))}{V_{fd}}\right]\left[\frac{d\Psi(r)}{dr} - \frac{d\Phi(r)}{dr}\right]}$$

$$\equiv \int_{r_1}^{R} L(\Phi, \Phi', \Psi, \Psi') dr$$

does not depend on the value of $E_{dr,x}$. The variation method can be applied again to derive directly the functions of surface electric potential profiles $\Phi(r)(\Phi(r_1)=|V_{E1}|, \Phi(R)=|V_{out}|$ and $\psi(r)(\psi(r_1)=|V_{E1}^B|, \psi(R)=|V_{out}^B|)$ that give minimum drift time, and once again prove Eq. (14). From Eq. (11), $t_{dr}$ can be derived (20):

$$t_{dr} = \int_{r_1}^{R} \frac{dr}{\mu\frac{\partial\phi(r, x_{ch}(r))}{\partial r}} \quad (20)$$

$$= \int_{r_1}^{R} \frac{dr}{\frac{\mu}{2}\left(\frac{d\Psi(r)}{dr} + \frac{d\Phi(r)}{dr}\right) - \frac{\mu}{2}\left[\frac{(\Psi(r) - \Phi(r))}{V_{fd}}\right]\left[\frac{d\Psi(r)}{dr} - \frac{d\Phi(r)}{dr}\right]}$$

$$\equiv \int_{r_1}^{R} L(\Phi, \Phi', \Psi, \Psi') dr$$

The Lagrange function (21), $$L(\Phi, \Phi', \Psi, \Psi') = \frac{1}{\frac{\mu}{2}\left(\frac{d\Psi(r)}{dr} + \frac{d\phi(r)}{dr}\right) - \frac{\mu}{2}\left[\frac{(\Psi(r) - \phi(r))}{V_{fd}}\right]\left[\frac{d\Psi(r)}{dr} - \frac{d\phi(r)}{dr}\right]} \quad (21)$$

$$= \frac{1}{\frac{\mu}{2}(\Psi' + \Phi') - \frac{\mu}{2}\left[\frac{\Psi - \Phi}{V_{fd}}\right][\Psi' - \Phi']}$$

has no explicit dependence on r. The Euler-Lagrange equations are now (23):

$$\begin{cases} L - \Phi'\frac{\partial L}{\partial \Phi'} = C_1 \quad (C_1 \text{ and } C_2 \text{ are constants}) \\ L - \Psi'\frac{\partial L}{\partial \Psi'} = C_2 \end{cases} \quad (23)$$

This leads to (24):

$$2L - \Phi'\frac{\partial L}{\partial \Phi'} - \Psi'\frac{\partial L}{\partial \Psi'} = C_1 + C_2 = C_3 \quad (24)$$

By carrying out the partial derivatives in Eq. (24) using Eq. (21), $3L=C_3$ is obtained. From Eq. (21), for an optimum drift path, the following equation has to be satisfied (25):

$$\frac{\partial \phi(r, X_{ch}(r))}{\partial r} = \tag{25}$$

$$\frac{1}{2}\left(\frac{d\Psi(r)}{dr} + \frac{d\Phi(r)}{dr}\right) - \frac{1}{2}\left[\frac{\Psi(r) - \Phi(r)}{V_{fd}}\right]\left[\frac{d\Psi(r)}{dr} - \frac{d\Phi(r)}{dr}\right] =$$

$$\text{constant} = E_{dr,r}$$

which is the same as Eq. (14). Eq. (25) can be used to find the best surface potential profiles $\Phi(r)$ and $\psi(r)$ in order to get a minimum $t_{dr}$. Rehak et al. (1989) obtained the solution for a constant backside potential, $\psi(r) = V^B =$ constant, which only satisfies Eq. (25). However, while Eq. (25) is the necessary condition to determine the best surface potential profiles $\Phi(r)$ and $\psi(r)$ that will give a minimum $t_{dr}$, it is insufficient because the drift channel has to be a straight line as well. From Eq. (17), Eq. (26) can be derived $$\Phi(r) - \psi(r) = Ar + B (A \text{ and } B \text{ constants}) \tag{26}$$

Therefore the full set of conditions is (27):

$$\begin{cases} \frac{1}{2}\left(\frac{d\Psi(r)}{dr} + \frac{d\Phi(r)}{dr}\right) - \\ \frac{1}{2}\left[\frac{\Psi(r) - \Phi(r)}{V_{fd}}\right]\left(\frac{d\Psi(r)}{dr} - \frac{d\Phi(r)}{dr}\right) = \text{constant} = E_{dr,r} \\ \Phi(r) - \Psi(r) = Ar + B \\ \Phi(r_1) = |V_{E1}|, \Phi(R) = |V_{out}|, \Psi(r_1) = |V_{E1}^B|, \Psi(R) = |V_{OUT}^B| \end{cases} \tag{27}$$

Without being bound by theory, it is believed that approximated results can be derived where only one of the conditions (Eq. (25) or (26)) is satisfied. However, the approximated results may be adequate for the design of the SBA, they are not the absolutely optimal designs. In one exemplary embodiment, the backside potential is set to be proportional to that of the front side (28), $$\psi(r) = |V_B| + \gamma \Phi(r)(0 \leq \gamma \leq 1) \tag{28}$$

At $\gamma = 0$, Eq. (28) is reduced to $\psi(r) = |V_B|$. Under these conditions, the backside surface electric potential profile is defined by the same spiral pattern designed for the front side. It is therefore symmetrical to the front side and can be called a symmetrical SBA. When $\gamma = 0$, the system describes a state of uniform backside bias, which is good for soft X-rays and for radiation hardness. For hard X-rays and relaxed radiation hardness requirements, however, a backside bias gradient can significantly extend the bias voltage range (29):

$$E_{dr,x} / E_{dr,r} = \tag{29}$$

$$\frac{X_{min}(R) - X_{min}(r_1)}{(R - r_1)} = = \frac{d}{2}\left[\frac{(1-\gamma)(|V_{out}| - |V_{E1}|)}{(R - r_1)V_{fd}}\right] \propto \frac{d}{R} \rightarrow$$

$$0 \text{ if } d \ll R$$

Eq. (25) can be solved analytically for $\Phi(r)$ and $$E(r) = \frac{d\Phi(r)}{dr},$$

and E(r) can be used to design the spiral implant pitch and width, although, since $\Phi(r)$ (for $\gamma \neq 1$) does not satisfy Eq. (26), the drift path is curved, and the resulting $t_{dr}$ is not the absolute minimum drift time.

In another exemplary embodiment, the backside potential is set to be proportional to that of the front side as in (28) but where $\gamma = 1$ (30), $$\Phi(r) = E_{dr,r}(r - r_1) + |V_{E1}| \tag{30}$$

$$\Psi(r) = |V_B| + \Phi(r)$$

$$E(r) = E_B(r) = E(r, x_{ch}) = E_{dr,r} = \frac{|V_{out}| - |V_{E1}|}{R - r_1}$$

For this case ($\gamma = 1$), the drift channel is flat (a straight line) and parallel to the surface ($E_{dr,x} = 0$), and the complete set of conditions (Eq. (27)) is satisfied. However, for $\gamma \neq 1$, the drift channel is curved, and the curvature goes to maximum when $\gamma \rightarrow 0$, or the classical uniform backside potential case, e.g., as described in Rehak et al. (2010).

For this case ($\gamma = 1$), the drift channel is very close to the front surface (31):

$$x_{ch} = x_{min} = \frac{d}{2}\left(1 - \frac{|V_B|}{|V_{fd}|}\right) \tag{31}$$

and the barrier height near the front surface is quite shallow (32):

$$\Delta \phi(r, x_{min}) = \Phi(r) - \phi(r, x_{min}) = = \frac{V_{fd}}{4} + \frac{|V_B|^2}{4V_{fd}} - \frac{|V_B|}{2} = \Delta \phi \tag{32}$$

If $|V_B| = V_{fd}$, $x_{ch} = 0$ and $\Delta \phi = 0$, the drift channel is right on the front surface. The finite value of $V_{E1}$ can be used to keep the drift channel away from the front surface. If $V_B$ is chosen in such way that the combined effect of $V_B$ and $V_{E1}$ will fully deplete the detector, then $V_B$ and $x_{ch}$ are (33):

$$|V_B| = V_{fd}\left(1 - 2\sqrt{\frac{|V_{E1}|}{V_{fd}}}\right) + |V_{E1}| \tag{33}$$

$$x_{ch} = d\sqrt{\frac{|V_{E1}|}{V_{fd}}}\left(1 - \frac{1}{2}\sqrt{\frac{|V_{E1}|}{V_{fd}}}\right)$$

For example, in one embodiment, for d=300 μm, $V_{E1}$=−7 V, $V_{fd}$=100 V, the remaining parameters are $V_B$=−54 V, $\Delta\phi$=5.3 V, and $x_{ch}$=69 μm, which are quite far away from the front surface. Alternatively, $V_B$ can be solved using Eq. (34).

$$|V_B| = V_{fd} - |V_{E1}| = \frac{3}{4}V_{fd}\left(|V_{E1}| - \frac{1}{4}V_{fd}\right) \tag{34}$$

$$x_{min} = \frac{1}{8}d; \text{ and } \Delta\phi = \frac{V_{fd}}{64}$$

Employing Eq (34) produces $V_B$=−75 V, $\Delta\phi$=1.6 V, and $x_{ch}$=38 μm, which are reasonable since the potential barrier height is larger than the Si energy band gap, and the drift channel is much deeper than the ion implantation depth (about 1) that defines the doped rings 15. In another exemplary embodiment where $\gamma \neq 1$, a constant drift field component in r is ($E_{dr,r}(r, x_{ch}(r)) = E_{dr,r}$) and the drift channel is curved, with a constant drift field $E_{dr,r}$ defined by (35):

$$E_{dr,r} = \frac{(1-\gamma)^2}{4V_{fd}(R-r_1)}\left[\left[\frac{(1-\gamma)|V_B|+(1+\gamma)V_{fd}}{(1-\gamma)^2}-|V_{E1}|\right]^2 - \left[\frac{(1-\gamma)|V_B|+(1+\gamma)V_{fd}}{(1-\gamma)^2}-|V_{out}|\right]^2\right] \quad (35)$$

and front surface electric potential ($\Phi(r)$; 36) and electric field ($E(r)$; 37) are:

$$\Phi(r) = \frac{(1-\gamma)|V_B|+(1+\gamma)V_{fd}}{(1-\gamma)^2} - \sqrt{\left[\frac{(1-\gamma)|V_B|+(1+\gamma)V_{fd}}{(1-\gamma)^2}-|V_{E1}|\right]^2 - \frac{4V_{fd}E_{dr,r}(r-r_1)}{(1-\gamma)^2}} \quad (36)$$

$$E(r) = \frac{2V_{fd}E_{dr,r}}{(1-\gamma)^2}\sqrt{\left[\frac{(1-\gamma)|V_B|+(1+\gamma)V_{fd}}{(1-\gamma)}-|V_{E1}|\right]^2 - \frac{4V_{fd}E_{dr,r}(r-r_1)}{(1-\gamma)^2}} \quad 37)$$

For a set of parameters $r_1=0$, $V_{E1}=0$, $V_{out}=-2V_{fd}$, $\gamma=0$, and $V_B=-V_{fd}$, the front surface electric potential and field are (38):

$$\begin{cases} \Phi(r) = V_{fd}\left(1-\sqrt{1-\frac{r}{R}}\right) \\ E(r) = \frac{V_{fd}}{R}\frac{1}{\sqrt{1-\frac{r}{R}}} \end{cases} \quad (38)$$

However, $E(r)$ has a singularity at $r=R$, which makes the design of the spiral impractical near $r=R$. To avoid this singularity, Eq. (34) and (36) can be solved to give (39) and set the upper limit for $|V_{out}|$:

$$\begin{cases} |V_B| \le V_{fd} \\ |V_{out}| < \frac{(1-\gamma)|V_B|+(1+\gamma)V_{fd}}{(1-\gamma)^2} \le \frac{2V_{fd}}{(1-\gamma)^2} \end{cases} \quad (39)$$

For uniform backside voltage ($\gamma=0$), $|V_{out}|_{\gamma=0}<|V_B|+V_{fd}\le 2V_{fd}$. For example, for a symmetrical SBA with $\gamma=0.3$, $|V_{out}|_{\gamma=0.3}\le 4V_{fd}$, which doubles the upper limit for $|V_{out}|$. Since the drift field $E_{dr,r}$ is roughly proportional to $$\frac{|V_{out}|}{R}\left(E_{dr,r} \sim \frac{|V_{out}|}{R}\right),$$

$|V_{out}|$ has to be large enough to ensure a modest drift field, especially for large R or for small $V_{fd}$ (high resistivity Si (>10 k$\Omega$-cm) or thin wafers (d<200 um)). A much higher upper limit of $|V_{out}|$ helps in these situations and only the symmetrical SBA ($\gamma>0$) is feasible.

The drift channel is located at (40):

$$x_{ch}(r) = \frac{d}{2}\left(1-\frac{|V_B|+(\gamma-1)\Phi(r)}{V_{fd}}\right) + \frac{d}{2}\frac{E_{dr,x}}{V_{fd}/d} \equiv \quad (40)$$

$$\equiv x_{min}(r) + \frac{d}{2}\frac{E_{dr,x}}{V_{fd}/d}$$

where $E_{dr,x}$ is a constant and approximated by Eq. (29).

Figure 6:
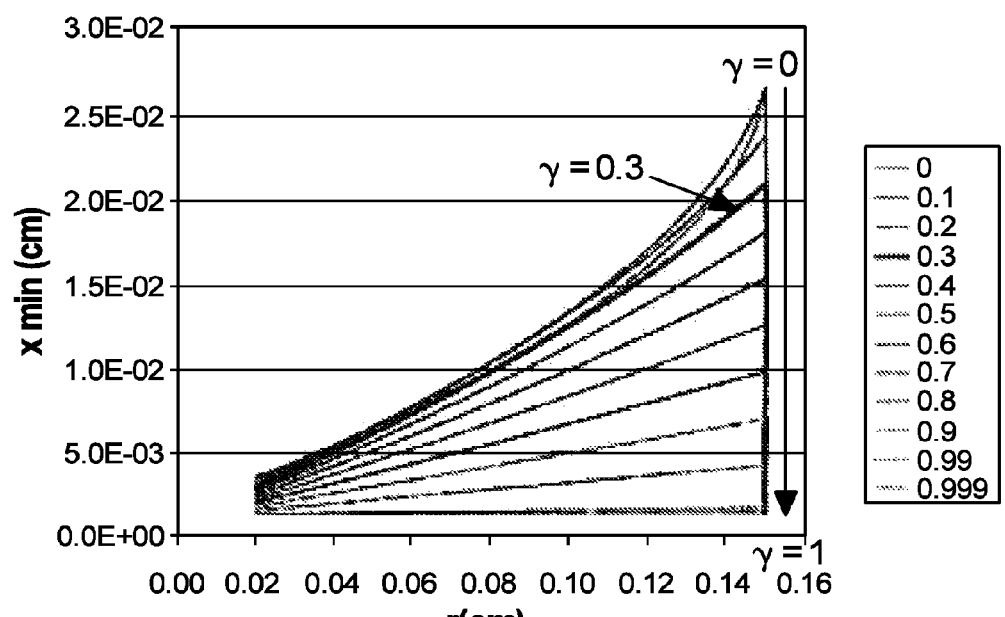
FIG. 6 is a plot showing the curved channels in a symmetrical SDD of the present invention.
Figure 7:
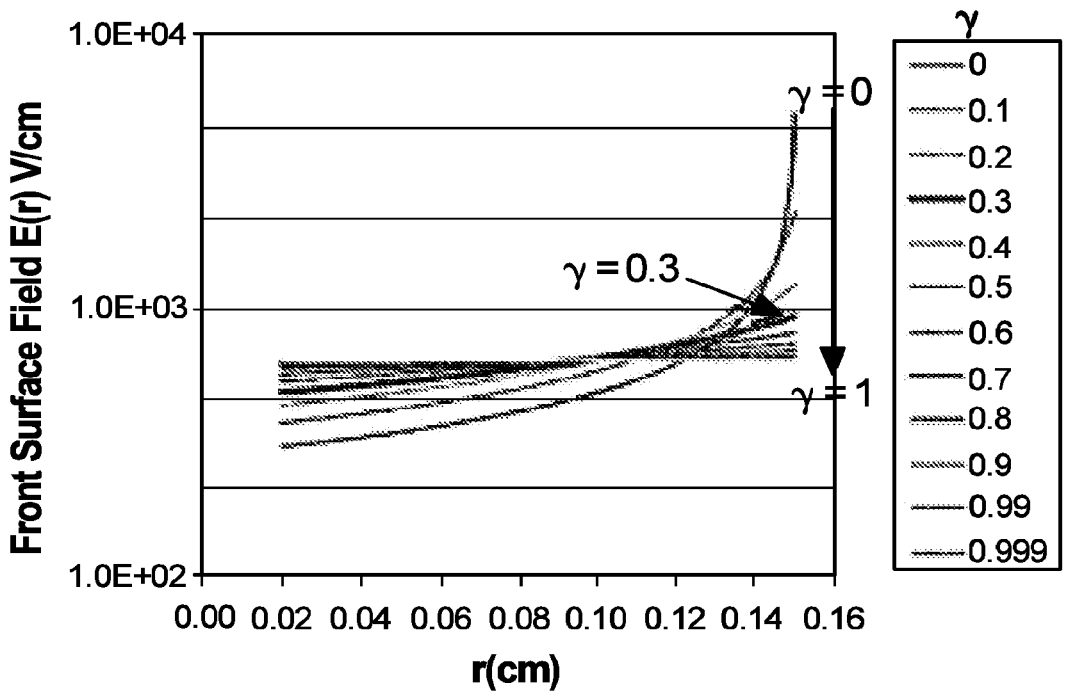
FIG. 7 is a plot showing the front surface electric field profiles in a symmetrical SDD as a function of γ.
Figure 8:
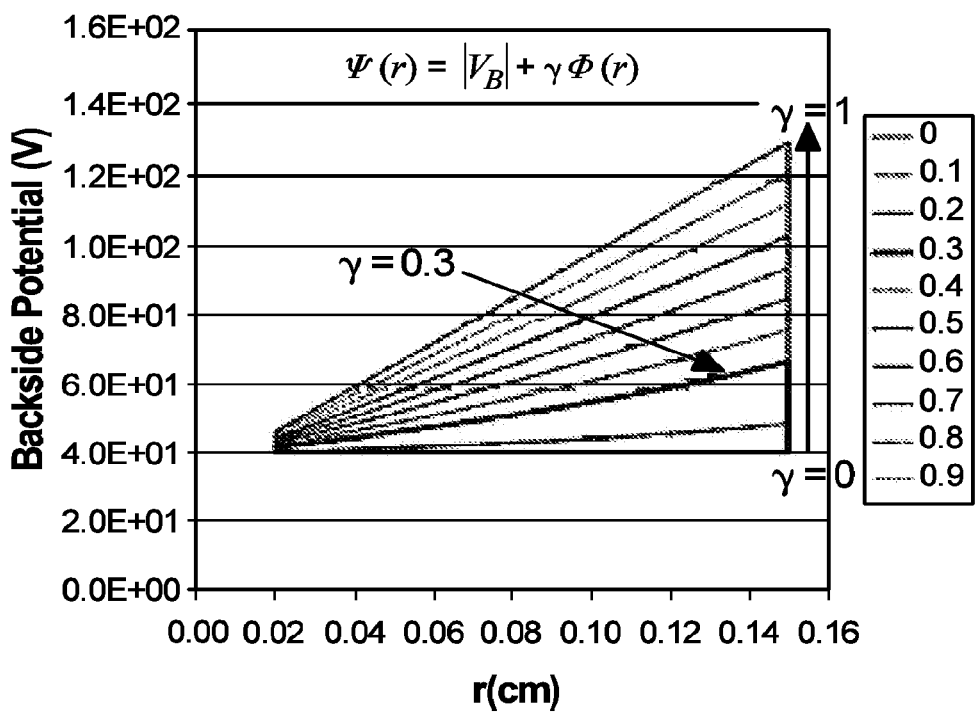
FIG. 8 is a plot showing the backside surface electric potential profiles in a symmetrical SDD as a function of γ.
Figure 9:
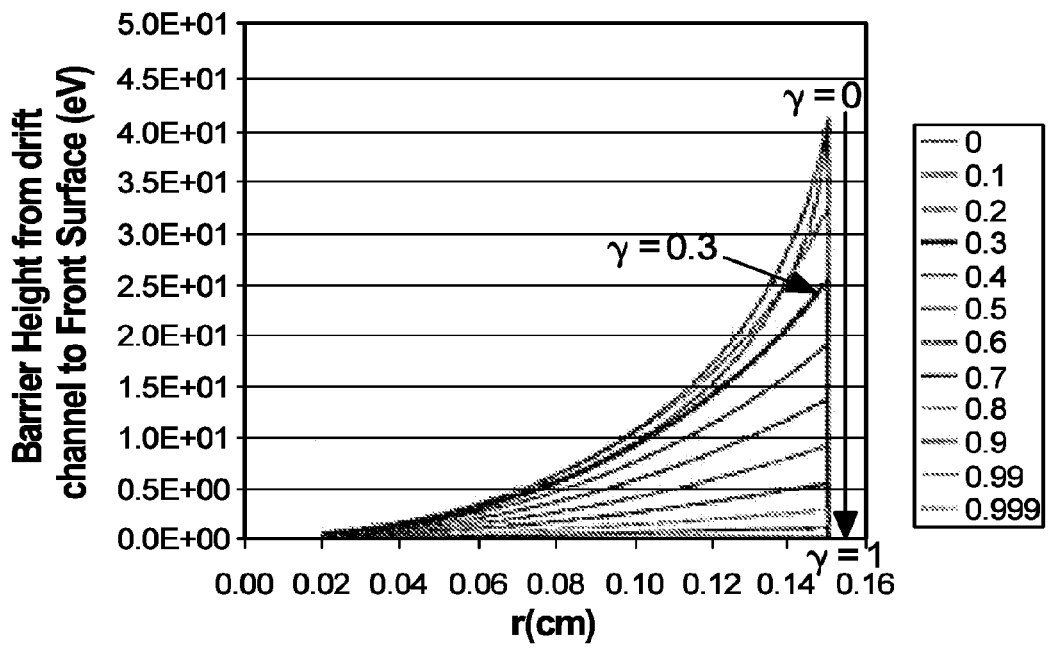
FIG. 9 is a plot showing the barrier height profiles with respect to the front surface in the drift channel in a symmetrical SDD as a function of γ.

As shown in Eq. (36), since neither $\Phi(r)$ nor $x_{ch}(r)$ (nor $x_{min}(r)$) is linear in r, the drift channel is curved. But as $\gamma\to 1$, its dependence on $\Phi(r)$ diminishes, and it becomes more like a straight line (or flat). In this case, the approximation is acceptable (when $\gamma\to 1$). FIG. 6 shows the curved drift channels (shown here for $x_{min}(r)$, since $x_{ch}(r)$ and $x_{min}(r)$ have the same curvature, and $x_{ch}(r)\approx x_{min}(r)$ for R>>d) as a function of r(cm) for an SDD having the following parameters: resistivity $\rho$=6 k$\Omega$-cm, d=280 μm, $r_1$=200 μm, R=1500 μm, $V_{out}=-2V_{fd}$, and $V_B=-V_{fd}$. As shown in FIG. 6, the largest curvature is at $\gamma\to 0$, or constant backside bias $V_B$. As $\gamma$ increases, the drift channel becomes straighter and shorter. At $\gamma=1$, it is a straight line parallel to the front surface. Therefore, by increasing the value of $\gamma$, the non-uniformity of the electric field on the front side (and backside) can be reduced, as shown in FIG. 7. In particular, the surface field near r=R can be significantly reduced. It appears that $\gamma=0.3$ is a reasonable choice, since it makes the drift channel reasonably straight; significantly reduces the surface field near r=R; does not make the backside bias voltage unreasonably high (see FIG. 8); and maintains a high enough barrier height in the drift channel with respect to the front surface (see FIG. 9).

Figure 10:
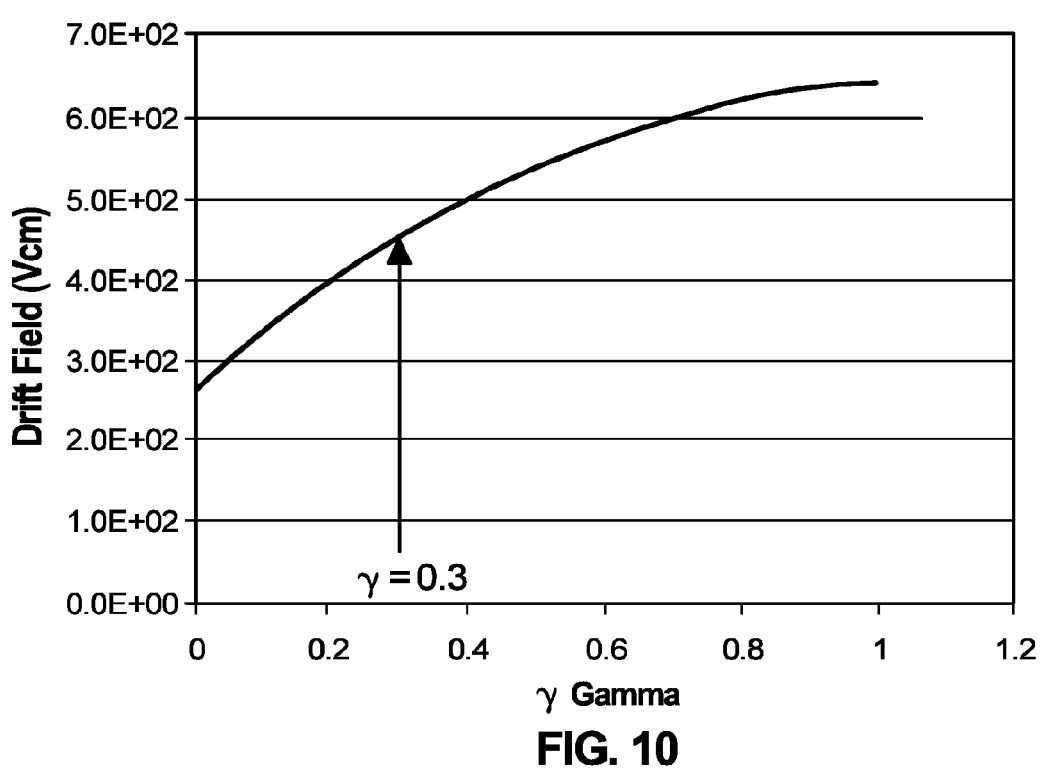
FIG. 10 is a plot showing the constant drift field $E_{dr,r}$ in a symmetrical SDD as a function of γ.

As illustrated in FIG. 10, the constant r-component of the drift field ($E_{dr,r}$) also increases with $\gamma$. At $\gamma=0.3$, it is about 450 V/cm on the average, which gives a drift time of $t_{dr}$=35 ns for R=1500 μm. Since the drift time is determined by $$t_{dr} = \frac{R^2}{\mu E_{dr,r}},$$

which is independent of the length of the actual drift channel (curved or flat), the actual value of the constant field of $E_{dr,r}$ is minimum (270 V/cm) for the channel ($\gamma=0$) with highest curvature, and maximum (640 V/cm) for the flat channel ($\gamma=1$). The corresponding drift times are $t_{dr}^{max}$=58 ns ($\gamma=0$) and $t_{dr}^{min}$=24 ns ($\gamma=1$).

Figure 11A:
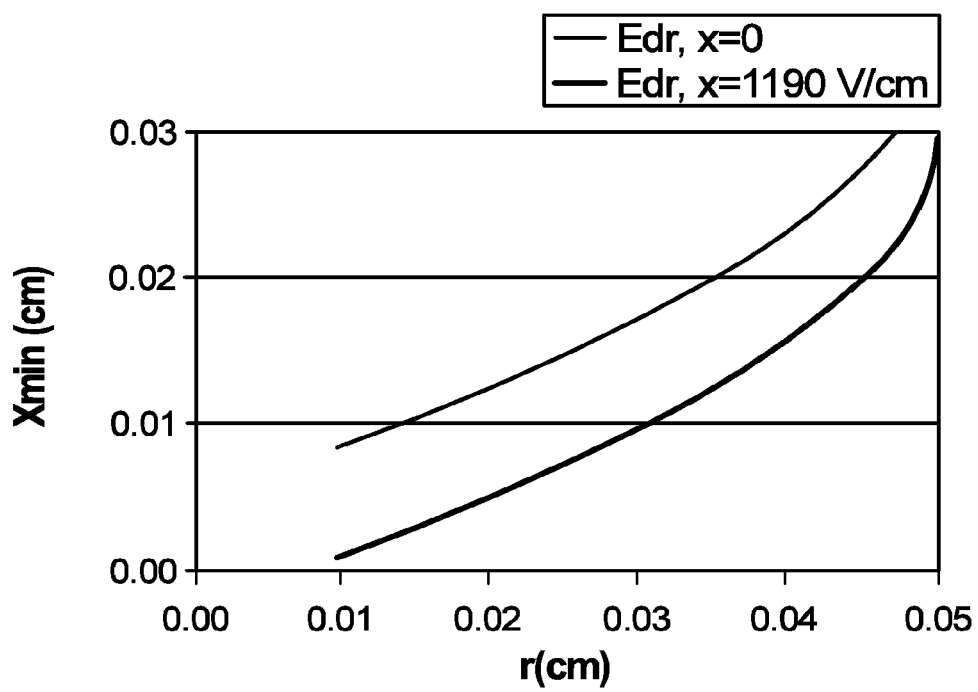
FIG. 11A is a plot that shows the position of drift channel in the SDD for uniform backside biasing (γ=0) with or without consideration of the non-zero field in the x-direction.
Figure 11B:
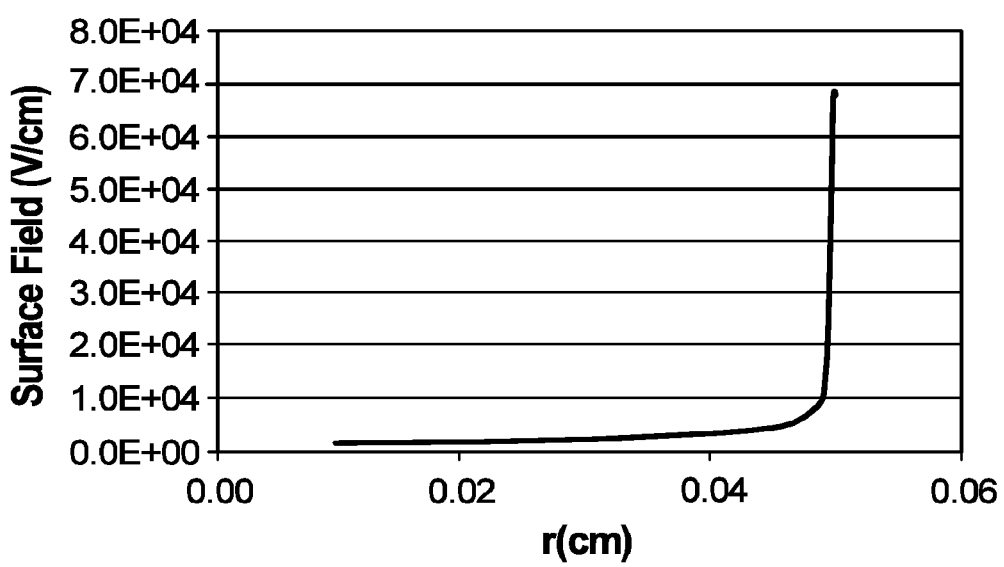
FIG. 11B is a plot that shows the field on the front surface in the SDD of FIG. 11A.
Figure 12A:
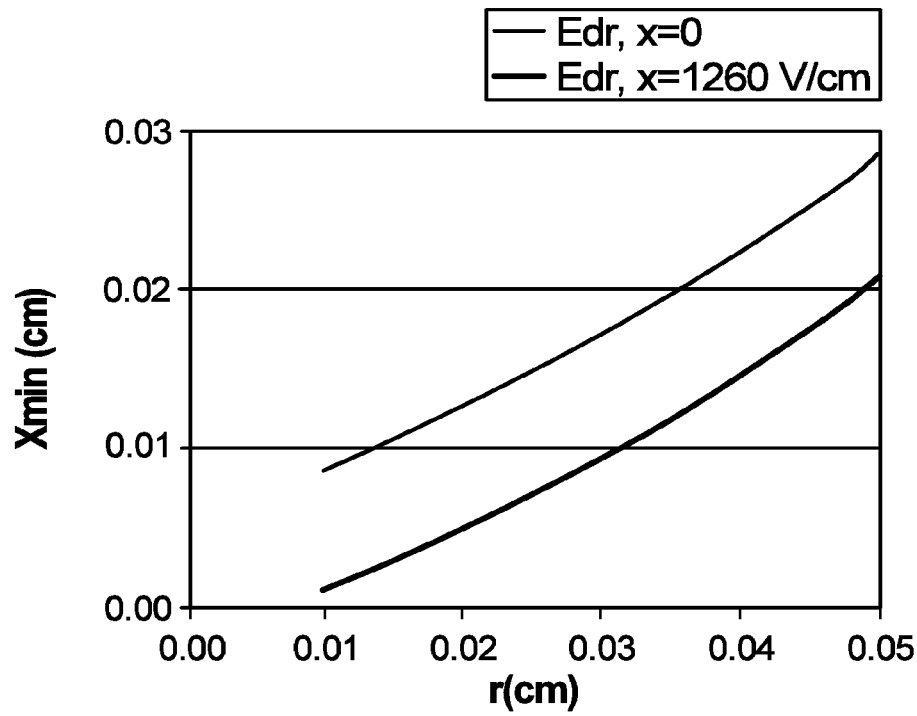
FIG. 12A is a plot that shows the position of drift channel in the spiral SDD (γ=0.3) with or without consideration of the non-zero field in the x-direction.
Figure 12B:
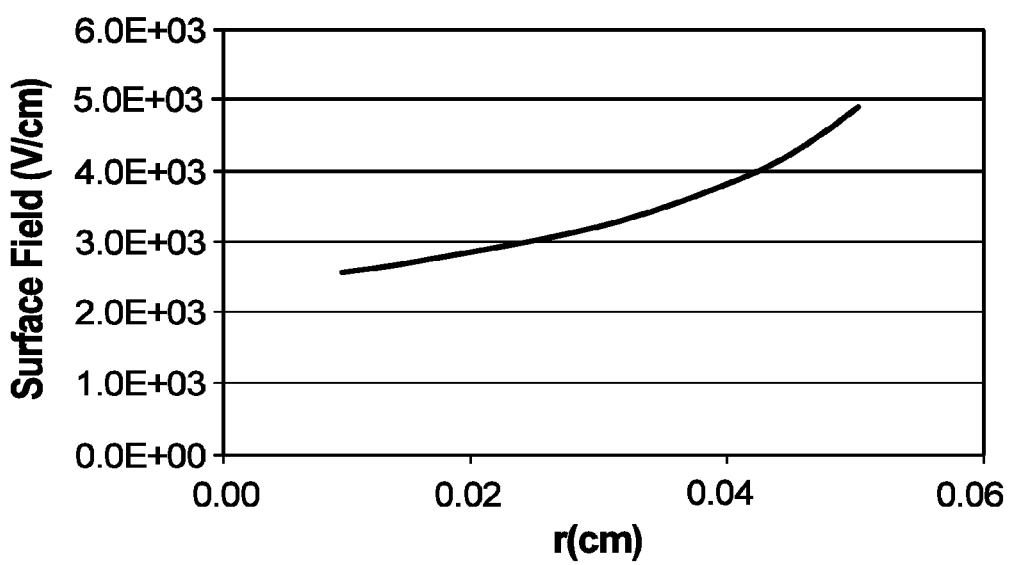
FIG. 12B is a plot that shows the field on the front surface in the SDD of FIG. 12A.

The x-component of the drift field $E_{dr,x}$ may be negligible if R>>d (Eq. (29)). When R≈d, however, the drift channel $x_{ch}(r)$ will be shifted significantly from $x_{min}(r)$. As shown in FIG. 11A, for an SDD with R=500 μm (~d=300 μm) and $\gamma=0$, the drift channel is shifted towards the backside by about 70 μm and out of the detector boundary near the backside (see FIG. 11B) with a large surface electric field near r=R. By way of example, by choosing a design with $\gamma=0.3$ as shown in FIG. 12, it is possible to keep the drift channel within the detector; reduce the surface electric field by a factor of 10; and make the drift path straighter.

In summary, the surface potential and field profiles can be used to design an optimal SBA and/or SDD. For both, the spiral pitch p(r), width W(r), front surface field E(r), implant sheet resistance $\rho_s$, current I, and length of each turn $\alpha r$ are related based on Eq. (1). For a given E(r) (Eq. (37)), and a given pitch p(r), the spiral is calculated in (41):

$$\varphi(r) = \int_{r_1}^{r} \frac{2\pi dr}{p(r)} \quad (41)$$

with the spiral width in (42):

$$W(r) = \frac{\rho_s I a r}{E(r) p(r)} \quad (42)$$

For example, for a pitch p(r) proportional to square root of r in (43):

$$p(r) = p_1 \sqrt{\frac{r}{r_1}} \quad (43)$$

The spiral can be designed as (44), $$r = \left[\sqrt{r_1} + \frac{p_{1\phi}}{4\pi\sqrt{r_1}}\right]^2 \quad (44)$$

with the width profile calculated according to (45), $$W(r) = \frac{\rho_s I a \sqrt{r r_1}}{E(r) p_1} \quad (45)$$

This design gives a constant drift field in r, and a curved drift channel. To avoid the singularity in E(r) at r=R (reach-through), the conditions described by Eq. (46) have to be satisfied in and the detector operation.

$$\begin{cases} |V_B| \le V_{fd} \\ |V_{out}| < \frac{(1-\gamma)|V_B| + (1+\gamma)V_{fd}}{(1-\gamma)^2} \le \frac{2V_{fd}}{(1-\gamma)^2} \end{cases} \quad (46)$$

If γ≠0, the designed SBA is a symmetrical SBA, and the backside has the same spiral pattern, but biased according to Eq. (28). With a symmetrical SBA and/or SDD design, the bias voltage range of the outer ring can be significantly increased, thus increasing the drift field of the SBA and/or SDD. This can also make the drift channel straighter (nearly "flat"), making the drift time close to the absolute minimum. Thus, in a preferred embodiment, the spiral pitch can be chosen from a constant, to an arbitrary function of r, and the spiral width will generally change with r according to (42).

(2) Spiral Biasing Adapter Design

The SBA is interconnected with the closed rings of the SDD and preferably designed to give minimum drift time of carriers as described in Section (1) for a given set of biasing voltages and the spiral current. Specifically, the pitch of the SBA (p(r)) and its implant width (W(i)) are defined by the calculations that give a minimum drift time of carriers ($t_{dr}$). The SBA typically has spiral-shaped ion implants that define the desired voltage profile. The spiral-shaped ion implants include a circular spiral, a triangular spiral, a square spiral, a hexagonal spiral, a polygonal spiral, or a shaped spiral that is defined around a fixed center point stepwise or curvilinear at a continuously increasing distance from the fixed center point.

The radial dependence of the pitch of the spiral within the SBA ($p_{SBA}(r)$) is the same as that of the SDD single cell ($p_{SDD}(r)$), which in general varies with radius. In a preferred embodiment, the pitch of the single SDD cell is the same as that of the SBA ($p_{SDD}(r)=p_{SBA}(r)$), but its width can be freely defined. That is, the width of the implanted spiral does not have to equal to that of the SDD single cell, and can be made small to minimize the current. In contrast, the width of SDD can be increased, i.e., $W_{SDD}(r) \ge W_{BA}(r)$, to minimize the surface area on the SDD. Thereby, the geometry of a single SDD cell can be defined by concentric rings of ion implants with maximum width ($W_{SDD}(r) > W_{BA}(r)$) to minimize the surface current. In a preferred embodiment, as illustrated in FIG. 13B, $W_{SDD}(r) = \eta p_{SDD}(r)$ where η≥0.6. For example, in one embodiment, η can be set to 0.7, 0.8, 0.9, 1.0, etc. and any value therebetween. In general, however, η can be set to 0<η<1.

The SDD and the SBA can be formed on a same wafer as the SDD or the SDD array. Alternatively, the SBA can be formed on a separate wafer from the SDD. Preferably, the ion implant of the SBA is the same as that of the SDD, which allows fabrication of the SBA as a by-product of the SDD fabrication. Since both SBA and SDD are fabricated in a similar fashion, the overall composition of these devices will be described together with reference to the exemplary embodiments illustrated in the drawings. It should be understood that no limitation of the scope of the invention is intended. Alterations and further modifications of the inventive features illustrated in this disclosure, and additional applications of the principles of the inventions as illustrated in this disclosure, which would occur to one skilled in the relevant art and having possession of this disclosure, are to be considered within the scope of the invention.

The SDD has a front side and a back side with a first electric field applied to the front side and a second electric field applied to the back side. In one embodiment, the applied first and second electric fields cause electrons liberated within the SDD to experience a constant drift field and to follow a flat drift channel over a minimum drift time possible for the SDD. In another embodiment, the applied first and second electric fields cause electrons liberated within the drift detector to experience a constant drift field and to follow a curved drift channel over a minimized drift time for the configuration of first and second electric fields. The applied first and second electric fields can be symmetric or asymmetric.

The first electric field and the second electric field can be defined by an identical or nearly identical SBA pattern. Alternatively, the first electric field can be defined by one SBA pattern and the second electric field can be defined by a different SBA pattern. The SDD can be connected to an SBA at the front side, or at both the front side and the back side. In particular, for single-sided SDD (with uniform bias voltage on the back side), one SBA is needed for each SDD array. In contrast, for a double-sided SDD with potential gradients on both surfaces, at least two SBAs are needed for each SDD array.

Figure 18:
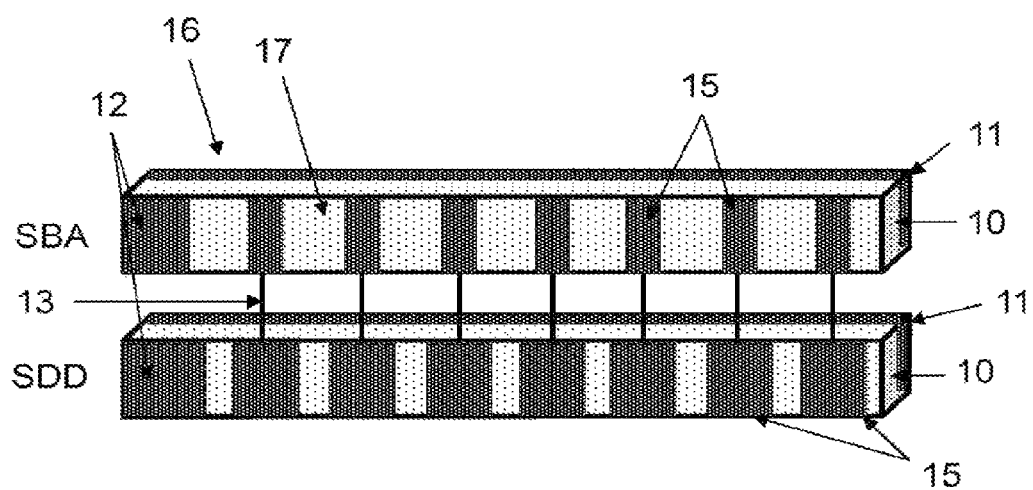
FIG. 18 is a schematic cross-sectional illustration of an exemplary SDD array with an interconnected SBA chip.

Referring to FIG. 18, an SBA/SDD includes a substrate 10 having a first conduction type, and with a top 17 and a bottom 16 surface. The top 17 and bottom 16 surfaces are opposite one another and can be oriented in any direction. A layer 11 having a second conduction type can be disposed at the bottom 16 surface of the substrate 10, and can define an entrance window layer. Typically, the entrance window layer, or bottom surface 16, faces incoming radiation. An island region 12 having the first conduction type can be disposed at the top surface 17 of the substrate 10. The island region 12 can be an anode or a cathode. For the n-type substrate 10, the island region 12 is an anode and the rings 15 are a cathode, whereas for the p-type substrate 10, the island region 12 is a cathode and the rings 15 are an anode (switch of doping). In addition, the SBA/SDD can include a plurality of rings 15 (a, b, c, etc.) disposed at the top surface 17 of the substrate 10 and substantially circumscribing the island region 12. The number of rings is not particularly limited and can range from 1 to 100's, with 2-30 being preferred for small cells (small R≤1500 μm). The plurality of rings 15 can be doped and are electrically isolated from each other. In another embodiment, the SDD can have one or more field plate rings. There is no overlap of conductive contact over an adjacent doped ring. Also, there is no doped layer in the substrate 10 connecting one doped ring to another doped ring. However, since the SBA is a spiral, all the rings are connected.

In one embodiment, the SBA can also function as a rectifying junction. In the embodiment where the spiral biasing adaptor does not function as a rectifying junction, the SDD has concentric ion-implant rings configured to function as rectifying junctions, which are connected to the SBA. The SDD can be connected to the SBA via wire bonding or double-metal interconnections as illustrated in FIG. 17 and FIG. 18.

Figure 17:
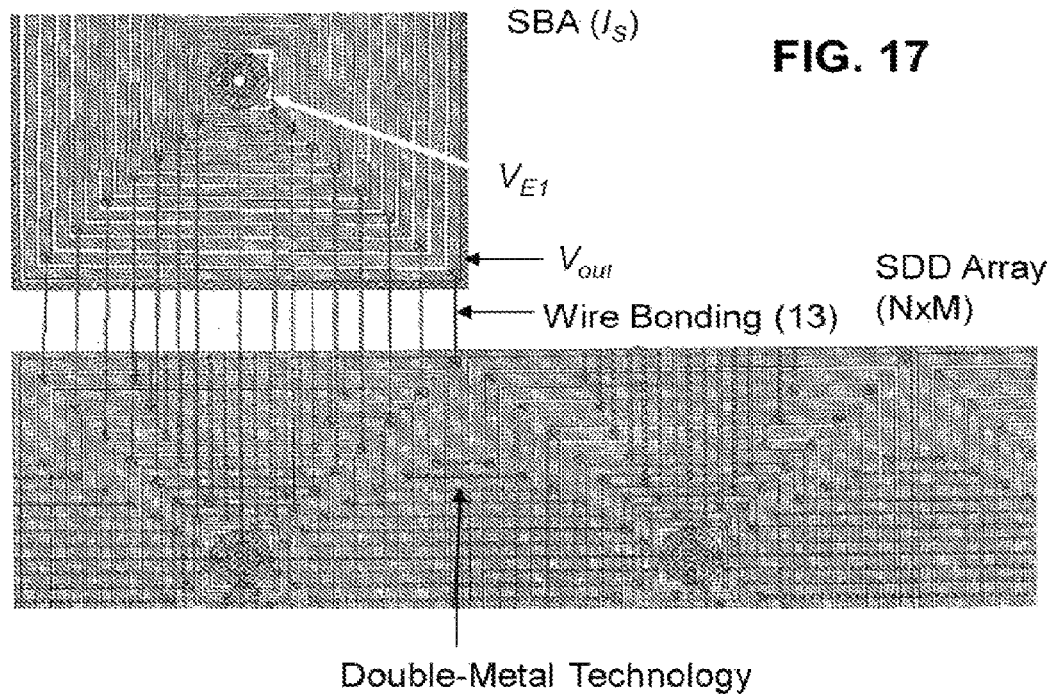
FIG. 17 is a schematic illustration of an exemplary SDD array with interconnected SBA chip. The pitch of the p$^+$ rings of the single SDD cell is the same as that of the SBA ($p_{SDD}(r)=p_{BSA}(r)$).

In a preferred embodiment, the SBA and the SDD or the SBA and the SDD array are detached, e.g., diced apart, and the rings in the SBA are interconnected with the corresponding rings in the SDD or one single SDD cell in the array by wire bonding 13, as illustrated in FIG. 17 (also see FIG. 18). The wire bonding is made by standard semiconductor manufacturing techniques and is desirable because there is no heat generated in the SDD or the SDD array, since the SBA is physically separated from the SDD. The wire bonding is also desirable because for small arrays and small SDD (typically no more than 30 rings), the wire bonds avoid any possibility of short circuit and/or system breakdown compared to the possible short circuit and dielectric breakdown in double-metal technology between $1^{st}$ and $2^{nd}$ metal. Finally, the wire bonding is desirable because the wire bond length is less than the size of the single SDD, which is usually less than 5 mm.

Alternatively, a double-metal technology can be used to interconnect the SBA and the SDD or the SDD array. (Park et al., *International Electron Devices Meeting Dec.* 7-10, 1997. IEDM '97. Technical Digest; incorporated in this disclosure by reference in its entirety). This method of interconnecting the SBA and the SDD is simple and can be easier than wire bonding to implement. However, a shortcoming of the double-metal technology is that it may provide an undesirable heat source for the SDD since SBA has to be on the same wafer of SDD. In yet another alternative embodiment illustrated in FIG. 17, the double-metal interconnections can be used to provide simple, robust connectivity between SDD cells in the array, while the wire bonding interconnections can be used to provide reliable connectivity between the single SDD cell and a detached SBA to avoid heat from SBA. The wire bond connection between the single SDD cell and a SBA on the same wafer can also be used.

Figure 16:
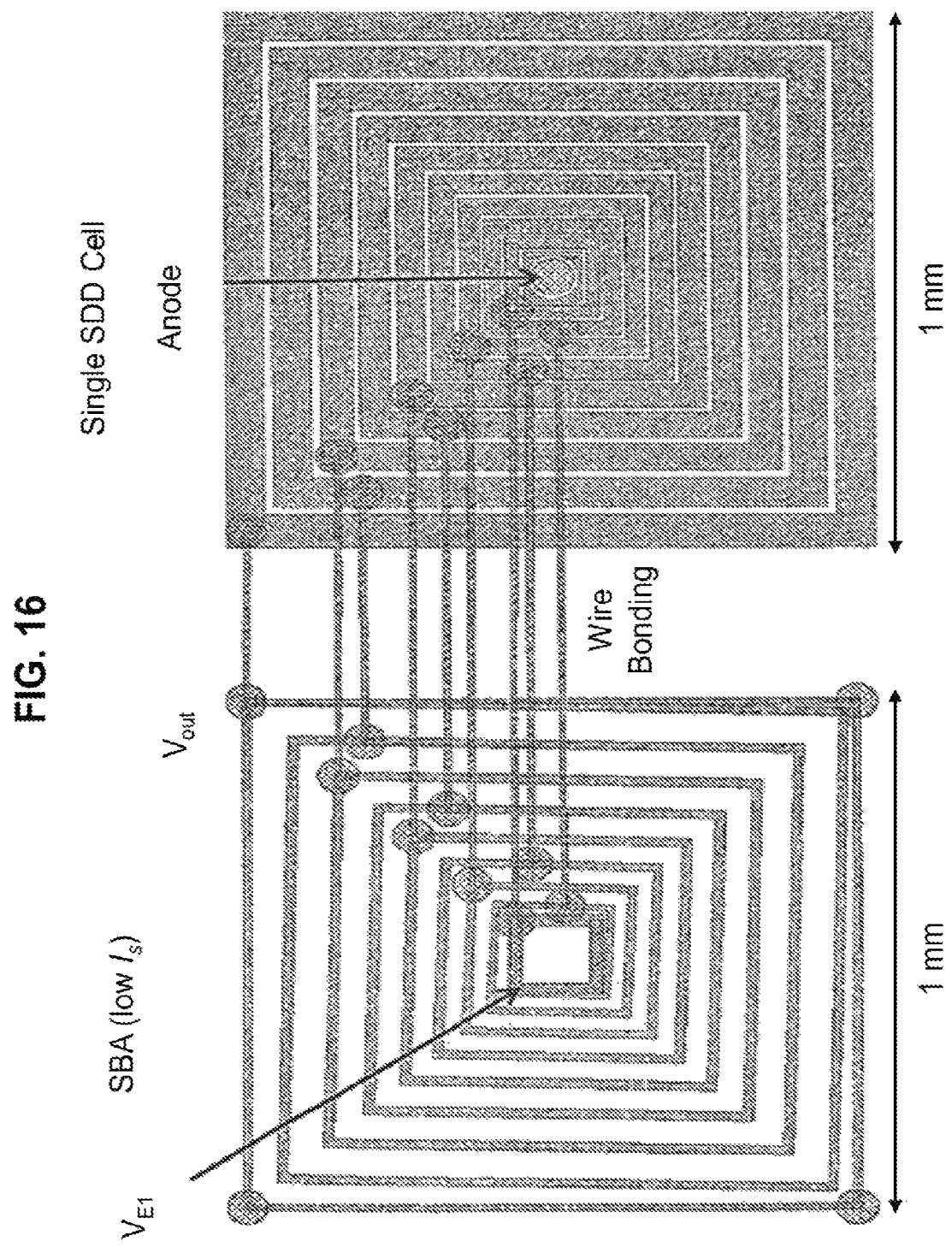
FIG. 16 is a schematic illustration of an exemplary SBA chip with narrow implants to reduce current, e.g., 5 mA, and the matching single SDD cell with wider implant rings for $p_{SDD}(r)=p_{BSA}(r)$, and $W_{SDD}(r)=0.8\, p_{SDD}(r)$.

The width of the SBA can be made smaller than that of the SDD at a given r in order to reduce the current flow, since the restriction for the implant width in a SBA can be relaxed compared to the spiral SDD. As illustrated in FIG. 16, the desired current can be 5 μA. For the matching single SDD cell, however, the implant width of corresponding rings can still be made wider, e.g., $0.8 \cdot P_{SDD}(r)$, to reduce the surface area and to provide a much better field profile in the bulk for carrier to drift to the anode.

In summary, the design of the SBA interconnected with the SDD or SDD array via double metal or wire bonds can be obtained from the calculations of the surface potential profiles that provide the minimum carrier drift time. The size of the SBA can be the same as that of a single SDD in the array, thus it can be very compact. The SBA can be fabricated on the same wafer as the SDD array with the same processing parameters. The SBA can also be fabricated on a separate wafer (in this case, SBA is naturally detached from SDD and/or SDD array) The power consumption by the SDD array is minimal. The heat generated in the SDD array can be zero or at least very minimal if detached from SBA. The current in the SBA can be further reduced by reducing the implant spiral width; while the corresponding width of implant rings in a single SDD cell can be made wider to reduce the SDD surface area and to provide a better bulk field profile. Finally, the double-metal interconnections provide simple, robust connectivity between single SDD cells in the array, while the wire bonding interconnections provide reliable connectivity between the SBA and the SDD cells in the array. Although, the wire bonding interconnections provide reliable connectivity between the SBA and the SDD cells in the array, it is mostly applicable to the systems with small number of rings, e.g. <30 rings, and small number of arrays, e.g. <5×5 array.

(3) Method of Forming an SBA/SDD Detector

An SBA/SDD detector can be made by standard semiconductor manufacturing processes (Rehak et al., *Nucl. Instr. and Meth. A*, 624, 260-264 (2010); Zhang et al., *IEEE Trans. Nucl. Sci.*, Vol. 47, No. 4, 1381-1385 (2000); each incorporated in this disclosure by reference in its entirety) using standard semiconductor materials such as silicon, germanium, silicon-germanium, silicon-carbide, CdTe, CZT, or equivalents thereof. Other semiconductor materials that also may be used are CdMnTe, $HgI_2$, TlBr, HgCdTe, CdMnTe, HgZnSe, GaAs, $PbI_2$, AlSb, InP, ZnSe, ZnTe, PbO, $BiI_3$, SiC, $Hg_xBr_{1-x}I_2$, $Hg_xCd_{1-x}I_2$, wherein x is greater than 0 and less than 1, $InI_2$, $Ga_2Se_3$, $Ga_2Te_3$, $TlPbI_3$, $Tl_4HgI_6$, $Tl_3As_2Se_3$, $TlGaSe_2$, or $AgGaTe_2$. It should be noted, however, that the disclosed embodiments are not limited to specific semiconductor materials. Those materials can be selected, in accordance with the application's requirements, as best understood by those of ordinary skill in the art. The dopants can be selectively chosen in accordance with a particular application requirement. Suitable dopants may be selected based on the atomic properties of the dopant and the material to be doped.

For example, for group IV semiconductors such as silicon, germanium, and silicon carbide, the most common dopants are acceptors from group III elements or donors from group V elements. Boron, arsenic, phosphorus, and occasionally gallium are typically used to dope silicon. Boron is the p-type dopant of choice for silicon integrated circuit production because it diffuses at a rate that makes junction depths easily controllable. Phosphorus is typically used for bulk-doping of silicon wafers, while arsenic is used to create junctions, because it diffuses more slowly than phosphorus and is thus more controllable. By doping pure silicon with group V elements such as phosphorus, extra valence electrons are added that become unbonded from individual atoms and allow the compound to become an electrically conductive n-type semiconductor. Doping with group III elements, which are missing the fourth valence electron, creates "broken bonds" (holes) in the silicon lattice that are free to move. The result is an electrically conductive p-type semiconductor. In this context, a group V element is said to behave as an electron donor, and a group III element behaves as an electron acceptor.

Doped rings can be made by masking off desired areas of the substrate with a photoresistive mask and doping the rings by a standard method such as ion implantation. This technique is especially useful in cases where the chemical or structural change in the semiconductor material is desired near the surface of the detector. However, it may be possible for ion implantation with very high-energy ion sources and appropriate masking materials could reach ion ranges of up to 10 or even 20 micrometers. For example, an enhanced implantation process could enable the fabrication of 3D detectors with substantially thin substrates equivalent to the average range of ions. Advantageously, forming a 3D detector with 3D electrodes, where the electrodes are formed by a high-energy implantation processes can be equivalent to forming a planar or 2D detector, which implies that the manufacturing process can be simplified. The anode can be created by a similar method. To form the field plate rings, an insulating layer can be added on top of the substrate by any suitable method such as thermal oxidation. (Appels et al., *PHILIPS RESEARCH Reports*, vol. 25, no. 2, pp. 118-132, April 1970; incorporated in this disclosure by reference in its entirety) In addition, where appropriate and required, a plurality of guard rings can be formed by doping at least one surface of a single cell detector utilizing the above-described doping processes. A mask can then be applied and in regions where it is not desired the oxide may be etched away by any suitable method, such as dry etch, wet etch, and reactive ion etch. (Wolf, S. et al. (1986). *Silicon Processing for the VLSI Era: Volume 1-Process Technology*. Lattice Press. pp. 531-546; incorporated in this disclosure by reference in its entirety). The desired conductive material for the field plate rings can be sputtered onto the surface, followed by the application of a mask and the etching away of the conductive material from undesired regions by a suitable means, such as a wet etch, and reactive ion etch. (Wolf, 1986). The field plate rings can be made of an electrically conductive material. For example, the field plate rings may be metallic or a metallic alloy. After the n-type and/or p-type regions have been doped, the substrate can be subjected to a high temperature annealing process to provide slight diffusion of the dopants into the single crystal substrate and to activate the n-type and p-type regions.

Doping concentrations for the above-described ring formation may be in the range of $10^{16}$ cm$^{-3}$ to $10^{20}$ cm$^{-3}$, or preferably in the range of $10^{19}$ atoms per cubic centimeter (cm$^3$) in the volume of the semiconductor material. However, it is also envisioned in an alternative embodiment that the doping concentration for the above-described rings and electrodes can be so high that it acts more like a metal conductor than a semiconductor and is referred to as a degenerate semiconductor. It is believed that at high enough dopant concentrations the individual dopant atoms may become close enough neighbors that their doping levels merge into a dopant band and the behavior of such a system ceases to show the typical traits of a semiconductor, e.g., its increase in conductivity with temperature. Nonetheless, a degenerate semiconductor still has far fewer charge carriers than a true metal so that its behavior is in many ways intermediary between semiconductor and metal.

In yet another alternative embodiment, and in particular for the high-Z semiconductor materials, instead of the highly doped semiconductor(s) described above, the electrodes may be produced from the metallic conducting material, such as for example gold (Au) or any other similarly situated metallic materials.

EXAMPLE

Example 1

Figure 1B:
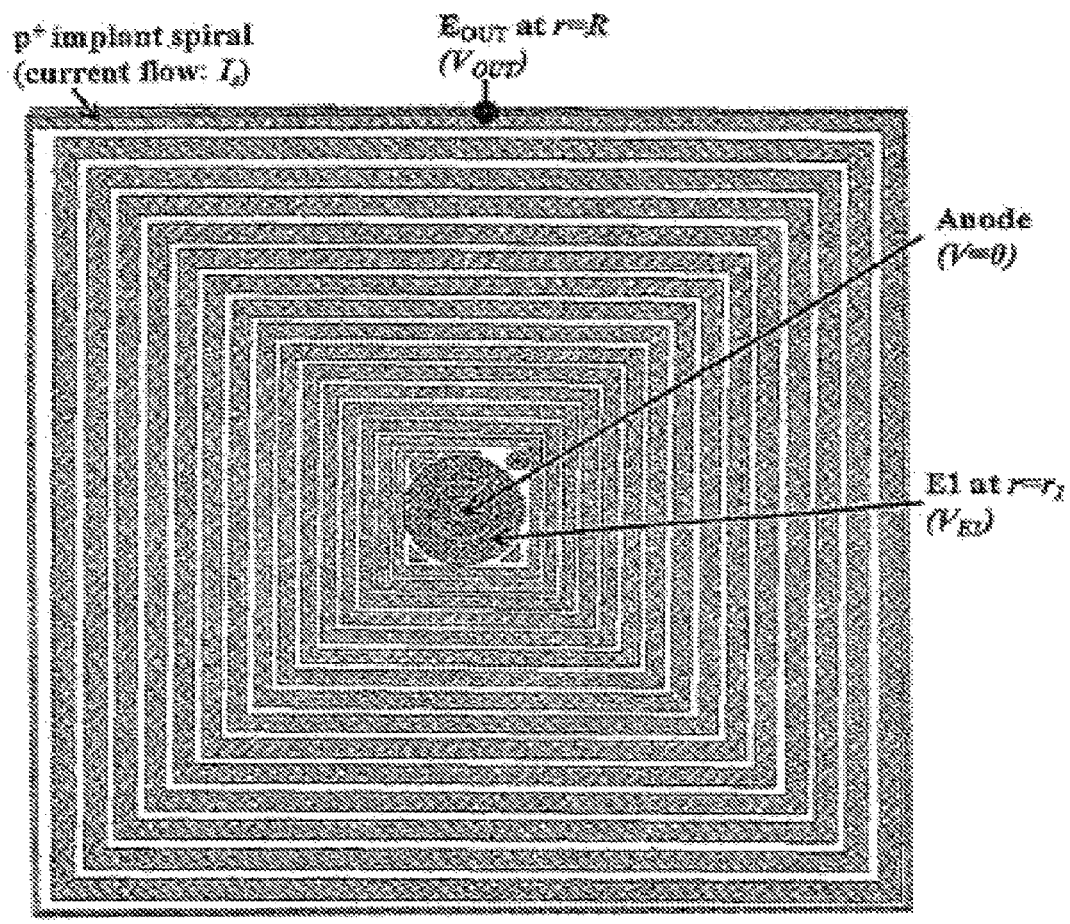
Figure 3:
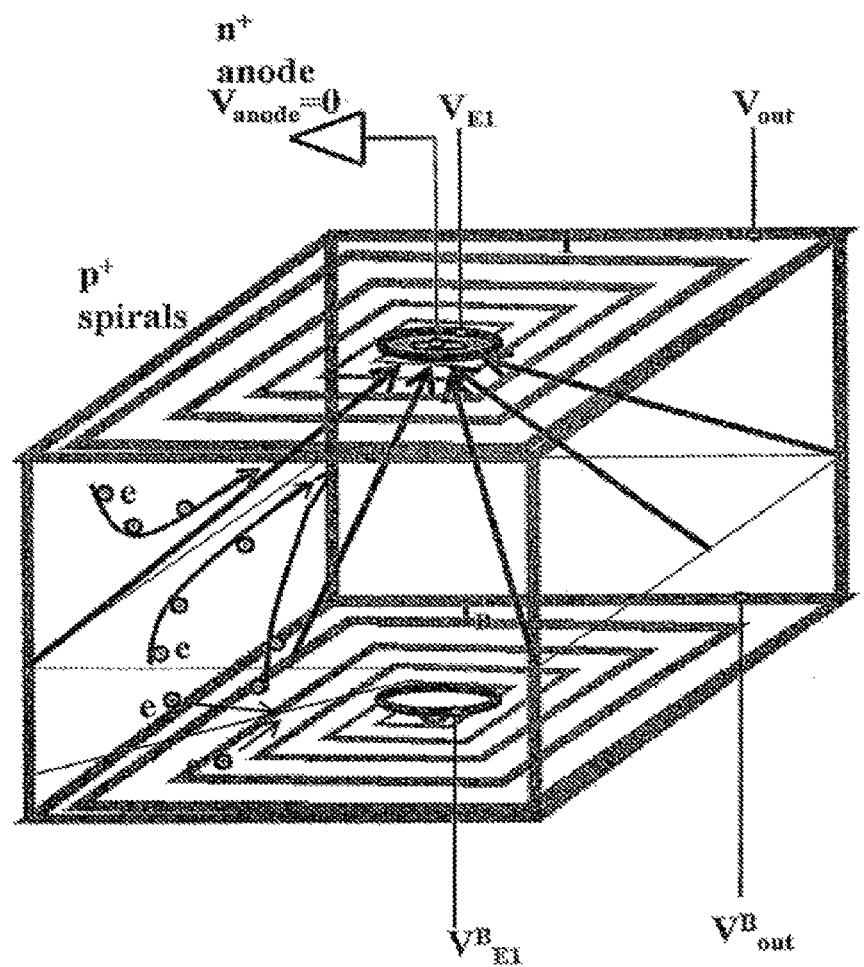
FIG. 3 is a schematic illustration of a prior art symmetrical double-sided spiral Si drift detector (SDD) in square shape showing the flow of electrons.
Figure 4:
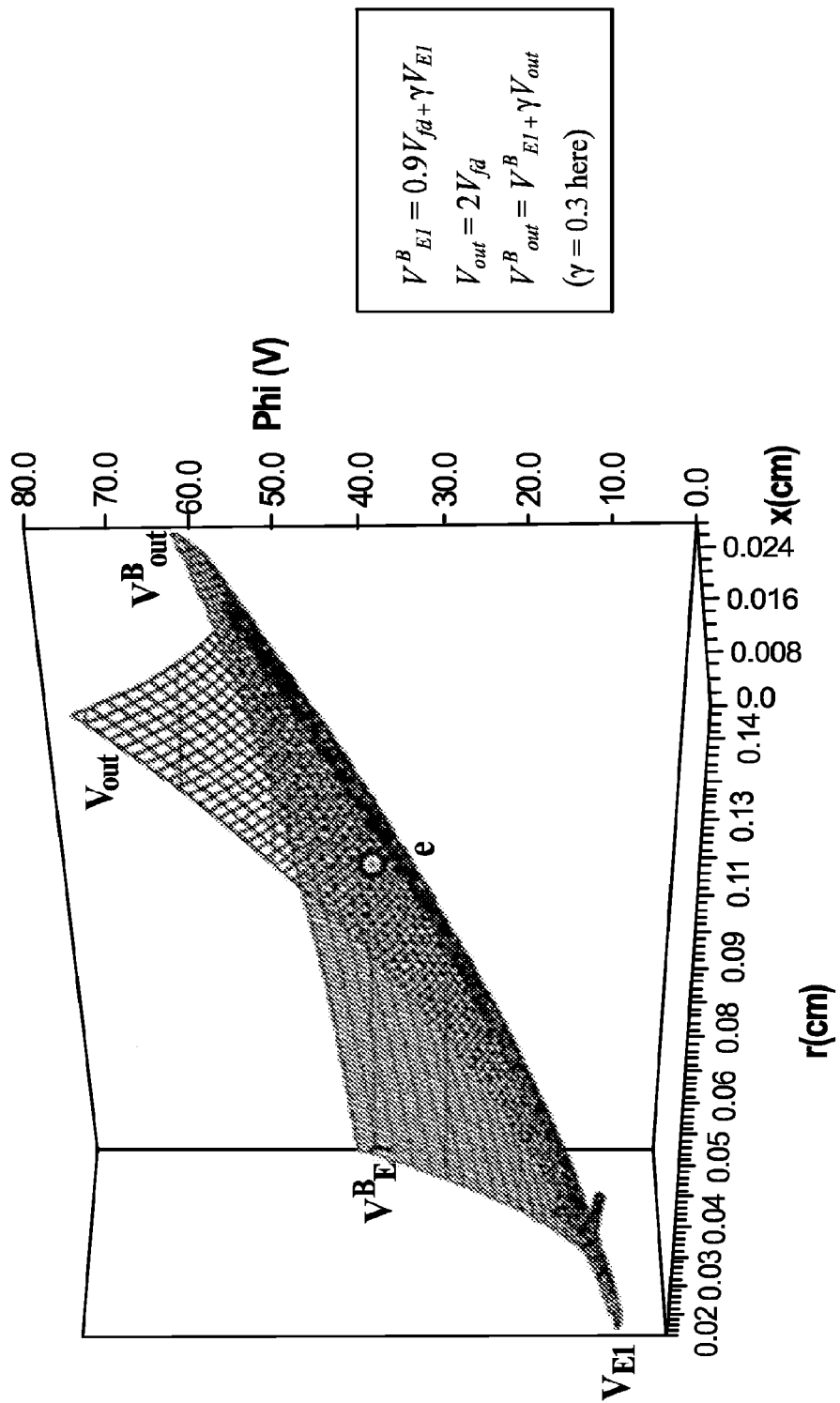
FIG. 4 is a 3 dimensional plot illustrating the negative potential profile for the prior art double-sided spiral SDD of FIG. 3.

In this example a conventional SDD was compared to an SDD that utilizes an SBA type implant chip. As shown in FIG. 1B, for a conventional spiral SDD (square type) with a side length of L=3 mm (or a drift radius of R=1.5 mm), the width W(r) was fixed to be ⅔ of the pitch p(r) to assure a more uniform drift electric field in the substrate (bulk). For a constant drift field in the drift channel, the Ohmic current running through the spiral that defines the front surface potential profile has to be about 20 μA at a bias of 126 volts. For one spiral SDD, its power consumption is about 2.5 mW. However, since the heat generated by the spiral heats up the SDD, the cooling down process can be challenging. Furthermore, for an SDD array of at least 100×100 elements, in addition to the heating problem, the power consumption can be too large as well, close to 25 Watts for an SDD array of modest size. Anything above 1 W is considered unreasonable power consumption for the SDD array.

Example 2

Figure 14:
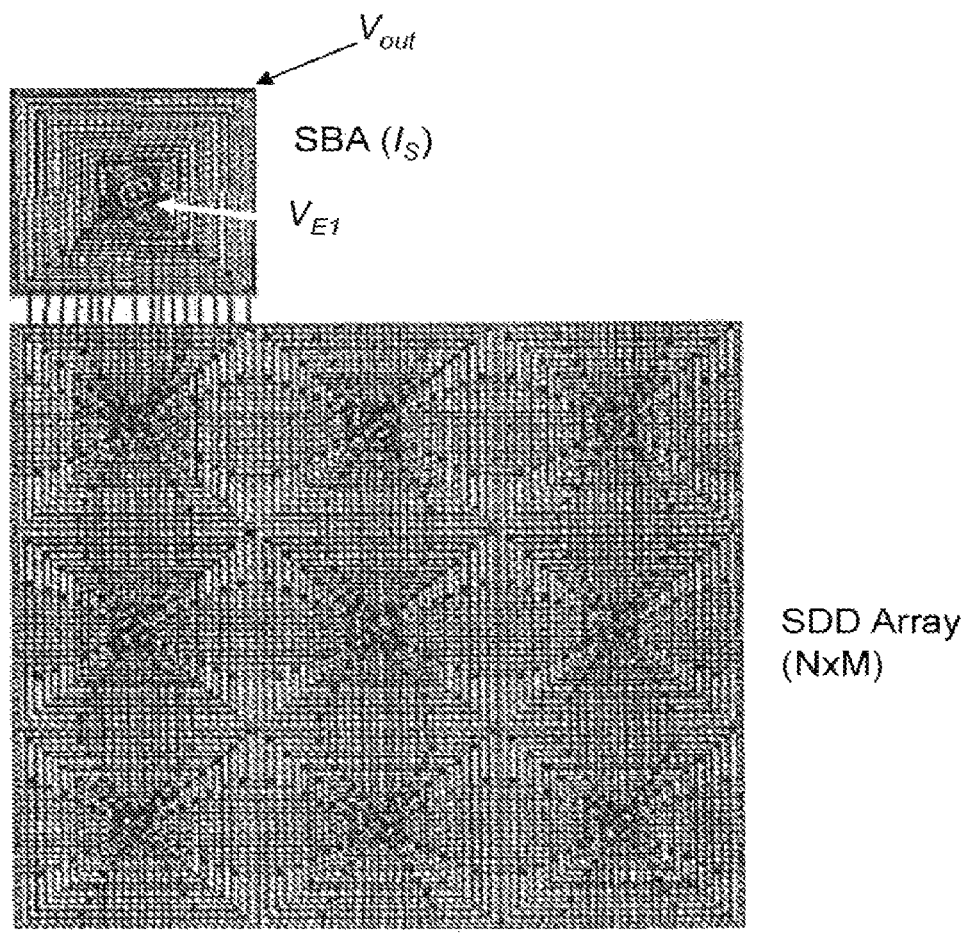
FIG. 14 is a schematic illustration of an exemplary SDD array (3×3) with interconnected SBA chip.

In contrast, the SBA was designed and fabricated on the same wafer as the SDD array with the same processing parameters (see FIG. 14), based on the following specifications:

| I | 20 μA | $r_1$ | 200 μm | $V_{fd} = V_B$ | 62.8 V |
|---|---|---|---|---|---|
| R | 1,500 μm | $E_{dr}$ | 403 V/cm | $V_{out} = 2V_{fd}$ | 126 V |
| ρ | 4 kΩ · cm | d | 300 μm | $t_{dr} = t_{dr, min}$ | 0.23 μs |

Figure 15A:
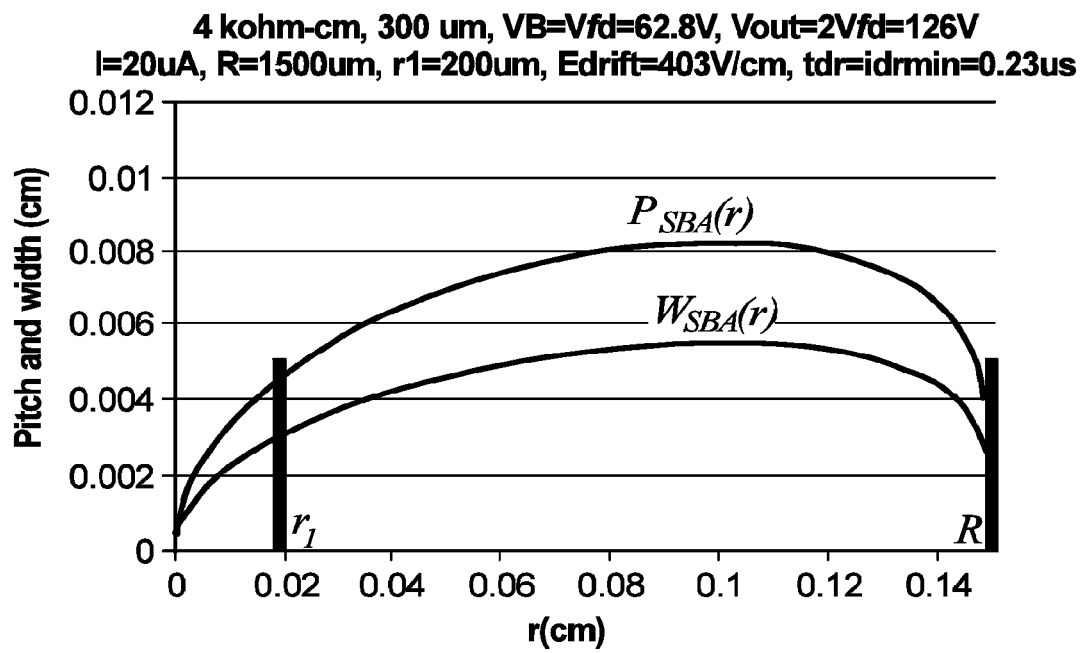
FIG. 15A is a plot that shows pitch and width of an SBA and matching single SDD cell as a function of radius (r) for $p_{SDD}(r)=p_{BSA}(r)$, and $W_{SDD}(r)=\eta p_{SDD}(r)$.
Figure 15B:
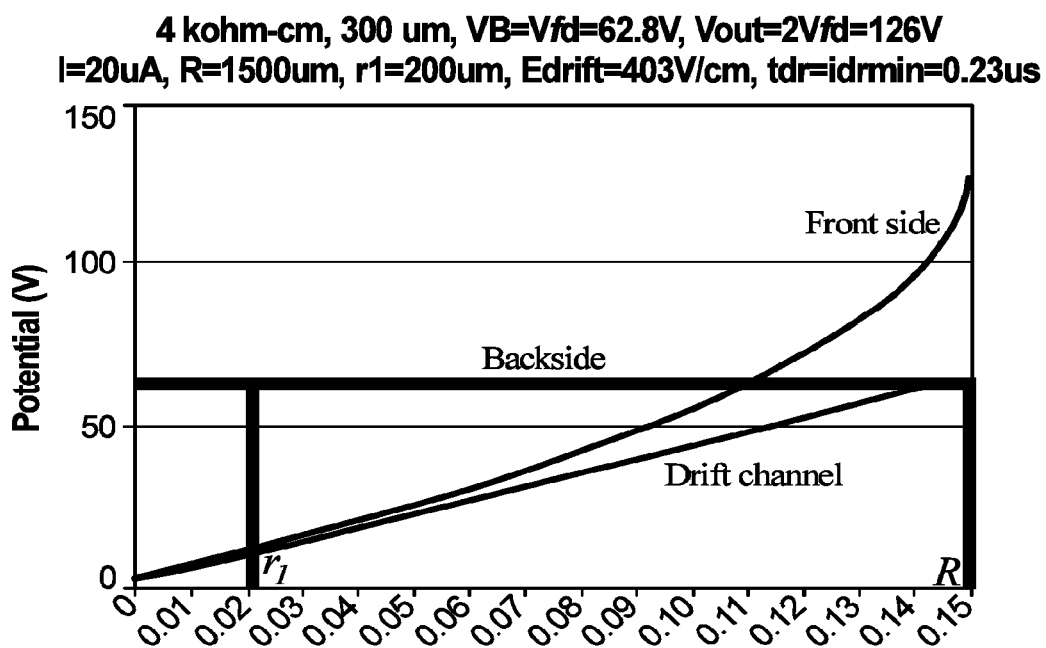
FIG. 15B is a plot that shows the negative potential (V) profiles of an SBA and matching single SDD cell as a function of radius (r) for $p_{SDD}(r)=p_{BSA}(r)$, and $W_{SDD}(r)=\eta p_{SDD}(r)$.

The pitch ($p_{SBA}$) and width ($W_{SBA}$) for the SBA were obtained from the calculations of the surface potential profiles that provide the minimum carrier drift time by applying Eq. (1) as a function of radius (r). As illustrated in FIG. 15A, the radius of the inner most ring ($r_1$) is set to 200 μm and the radius of the outer most ring (R) is set to 1,500 μm (or side length of 3 mm). The SBA illustrated in FIG. 13A is configured to mimic pitch ($p_{SBA}$) and width ($W_{SBA}$) obtained from FIG. 15A. In this exemplary embodiment, the radius dependence of the pitch of the spiral within the SBA ($p_{SBA}(r)$) was set to be the same as that of the SDD single cell ($p_{SDD}(r)$) shown in FIG. 13B. But the width of the single SDD cell can be freely defined, as long as it satisfies $W_{SDD}(r)=\eta p_{SDD}(r)$ where $\eta \geq 0.6$. Generally, a wider SDD can minimize the surface area. For example as illustrated in FIG. 16, the current in the SBA can be further reduced by reducing the implant spiral width, while the corresponding width of implant rings in a single SDD cell can be made significantly wider to reduce the SDD surface area and to provide a better bulk field profile. FIG. 13B illustrates an SDD having $p_{SDD}(r)=p_{BSA}(r)$, and $W_{SDD}(r)=0.8p_{SDD}(r)$ or $W_{SDD}(r)=0.8p_{BSA}(r)$. The power consumption by the SDD array when interconnected with the SBA is minimum and stays at 0.5 mW. FIG. 15B illustrates the resulting negative potential profiles in the SDD cell. The profile shows that drift channel is nearly flat.

Referring now to FIG. 17, the SBA can be interconnected with the SDD or SDD array via double metal or wire bonds. If the connectivity is established using wire bonds, any suitable conductive metal can be used, such as Al, Cu, Ag, Au, Ti and alloys of these metals, although Al is preferred. The width of the wire should be in the range of 15-30 μm, while the length is less than the size of the single SDD, which is usually <5 mm. Based on wire bond interconnections between the SDD and the SBA, the heat generated in the SDD array can be zero or practically zero. As shown in FIG. 17, the double-metal interconnections can be made between the SDD cells within the array to provide simple and robust connectivity within the array. Preferably, the metal used for double metal connections is Al, Cu, Ag, Au, Ti and alloys of these metals (Al, Cu, Ti are usually for Si substrate).

Example 3

Figure 19A:
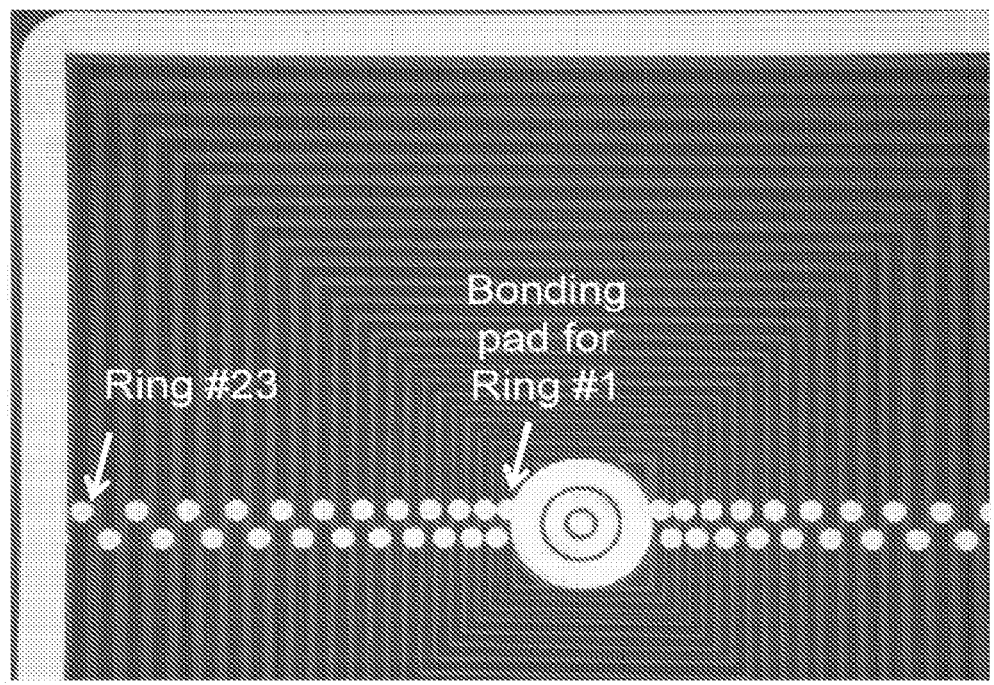
FIG. 19A-19B is a square spiral SBA prototype with 23 rings and Al bonding pads. The dimensions of the SBA are 3 mm by 3 mm and the total resistance is 5.7 MΩ(17.6 μA at 100V).
Figure 19B:
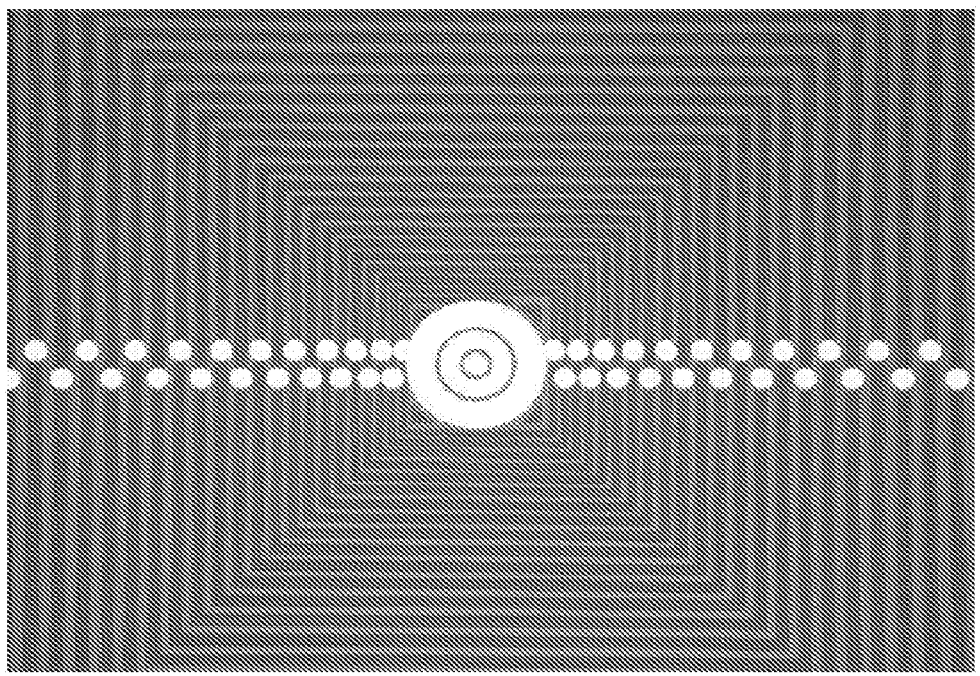

This example describes a prototype of SBA fabricated at the Brookhaven National Laboratory. As shown in FIG. 19A-19B, the SBA prototype is a square spiral with 23 rings and Al bonding pads. The dimensions of the SBA are 3×3 mm$^2$ and the total resistance is 5.7 MΩ (17.6 µA at 100V). FIG. 19A is the upper left corner region of the SBA. The corresponding Al bonding pads are connected to a closed-ring SDD of the same p(r). FIG. 19B is the center region of the SBA.

Figure 20A:
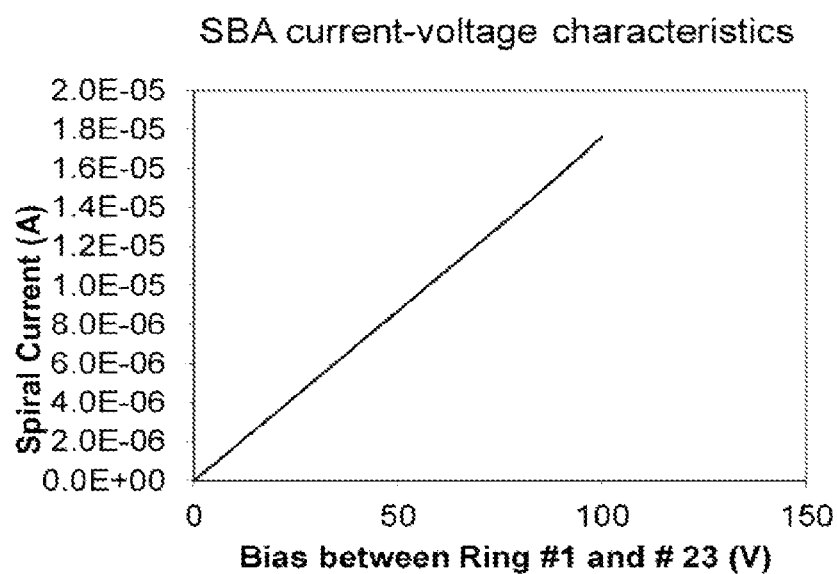
FIG. 20A is a plot that shows the current-voltage characteristics of the SBA having linear resistor behavior.
Figure 20B:
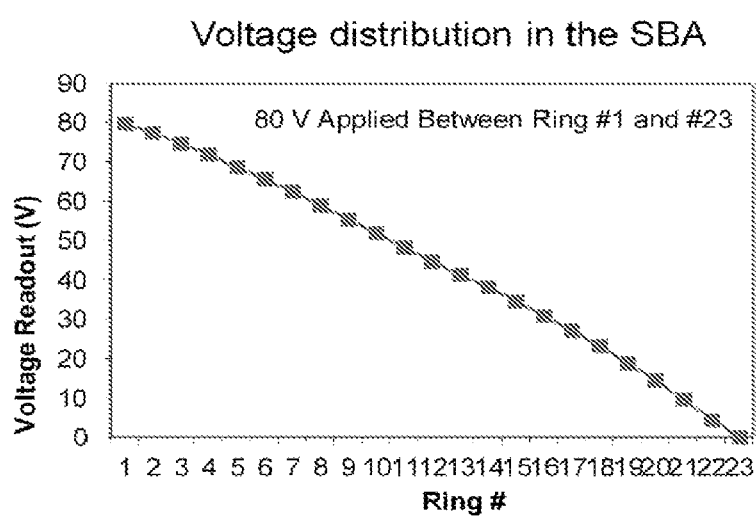
FIG. 20B is a plot that shows the voltage distribution of the SBA with designed specification.

FIG. 20A is a plot that shows the current-voltage characteristics of the SBA prototype. The plot shows linear resistor behavior in the voltage difference between the first and last spiral in the SBA. FIG. 20B is a plot that shows the voltage bias of the SBA prototype. The observed voltage distribution between the first and the last ring was 80 V. The voltage distribution was measured from the metal (Al) bonding pads on each ring. When connected to an SDD cell or an SDD array, the SDD cell or SDD array assumes the same voltage distribution that will give optimum drift field for carriers.

Although the disclosure has been described in connection with specific embodiments, it should be understood that the invention as claimed should not be unduly limited to such specific embodiments. Indeed, those skilled in the art will recognize, and be able to ascertain using this disclosure and no more than routine experimentation, many equivalents to the specific embodiments described in this disclosure. Such equivalents and modifications are intended to be encompassed by the following claims.

The invention claimed is:

1. A method of detecting radiation, comprising,
   detecting radiation by an array of drift detector cells;
   reducing overheating and power consumption of the drift detector array during the detection by connecting the drift detector array to a spiral biasing adaptor (SBA) configured to function as a voltage divider.

2. The method of claim 1, wherein a design of the spiral biasing adaptor (SBA) satisfies the equation $$\rho_s I \alpha r = E(r) W(r) p(r)$$

where $\rho_s$ is an implant sheet resistance, I is a current, $\alpha r$ is a length of each turn of the spiral, E(r) is a surface electric field at a radius r, W(r) is a spiral width of a spiral arm at radius r, and p(r) is a spiral pitch at radius r.

3. A drift detector comprising a Si drift detector (SDD) cell connected to a spiral biasing adaptor (SBA) configured to function as a voltage divider wherein a design of the spiral biasing adaptor satisfies the equation $$\rho_s I \alpha r = E(r) W(r) p(r)$$

wherein $\rho_s$ is an implant sheet resistance, I is a current, $\alpha r$ is a length of each turn of the spiral, E(r) is a surface electric field at a radius r, W(r) is a spiral width of a spiral arm at radius r, and p(r) is a spiral pitch at radius r, wherein the spiral pitch and the spiral width can both change with the radius, wherein the drift detector has a front side and a back side with a first electric field potential to the front side and a second electric field applied to the back side, wherein a negative electrical potential of a spiral in the SBA satisfies equation:

$$\varphi(r) = \int_{r_1}^{r} \frac{2\pi dr}{p(r)}$$

for a given spiral pitch p(r) at radius r, wherein the width of a spiral of the SBA satisfies equation:

$$W(r) = \frac{\rho_s I \alpha r}{E(r) p(r)}$$

wherein the electric field E(r) on the front side of the SBA and the SDD cell is defined by $$E(r) = \frac{2V_{fd} E_{dr,r}}{(1-\gamma)^2} \sqrt{\left[\frac{(1-\gamma)|V_B| + (1+\gamma)V_{fd}}{(1-\gamma)^2} - |V_{E1}|\right]^2 - \frac{4V_{fd} E_{dr,r}(r-r_1)}{(1-\gamma)^2}},$$

where $$V_{fd} \text{ is } \frac{qN_D d^2}{2\varepsilon_0 \varepsilon},$$

where $E_{dr,r}$ is drift field, $V_B$ is $0 < V_B < V_{fd}$, r is $r_1 < r < R$, $r_1$ is $0 < r_1 < 500$ µm, and γ is $0 \leq \gamma \leq 1$, wherein the potential on the backside of the SBA and the SDD cell is defined by, $$\Psi(r) = |V_B| + \gamma \Phi(r) \ (0 \leq \gamma \leq 1)$$

with a separate SBA.

* * * * *